United States Patent
Futa et al.

(10) Patent No.: US 10,719,853 B2
(45) Date of Patent: Jul. 21, 2020

(54) ADVERTISEMENT DISTRIBUTION METHOD AND ADVERTISEMENT DISTRIBUTION SYSTEM

(71) Applicant: Panasonic Intellectual Property Corporation of America, Torrance, CA (US)

(72) Inventors: Yuichi Futa, Ishikawa (JP); Takahiro Yamaguchi, Osaka (JP); Motoji Ohmori, Osaka (JP); Natsume Matsuzaki, Osaka (JP); Masayuki Kozuka, Osaka (JP); Masaya Yamamoto, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 331 days.

(21) Appl. No.: 14/407,102

(22) PCT Filed: Oct. 24, 2013

(86) PCT No.: PCT/JP2013/006285
§ 371 (c)(1),
(2) Date: Apr. 1, 2015

(87) PCT Pub. No.: WO2014/064940
PCT Pub. Date: May 1, 2014

(65) Prior Publication Data
US 2015/0220998 A1 Aug. 6, 2015

Related U.S. Application Data

(60) Provisional application No. 61/718,867, filed on Oct. 26, 2012.

(51) Int. Cl.
G06Q 30/02 (2012.01)

(52) U.S. Cl.
CPC ..... *G06Q 30/0269* (2013.01); *G06Q 30/0241* (2013.01)

(58) Field of Classification Search
None
See application file for complete search history.

(56) References Cited

U.S. PATENT DOCUMENTS

2002/0049839 A1 4/2002 Miida et al.
2011/0055044 A1* 3/2011 Wiedl ............ G06Q 30/02
705/26.5

(Continued)

FOREIGN PATENT DOCUMENTS

| JP | 2002-132912 | 5/2002 |
|----|-------------|--------|
| JP | 2002-298014 | 10/2002 |

(Continued)

OTHER PUBLICATIONS

International Search Report dated Nov. 19, 2013 in International (PCT) Application No. PCT/JP2013/006285.

Primary Examiner — Anita Coupe
Assistant Examiner — Michael J Cross
(74) Attorney, Agent, or Firm — Wenderoth, Lind & Ponack, L.L.P.

(57) ABSTRACT

To provide an advertisement distribution method of determining a distribution destination of an advertisement of a product that has a low direct relevance to execution pieces of information collected from home appliances. The advertisement distribution method includes: a collecting step of collecting, from each of one or more of home appliances owned by each of users, one or more pieces of execution information each indicating a function that has been executed by the home appliance; a detecting step of, with respect to each user, detecting an unused function that has not been used in each home appliance by analyzing the collected pieces of execution information and functions of (Continued)

the home appliance; and a transmitting step of extracting a user who is expected to purchase a product based on a detection result, and transmitting an advertisement to one or more of the home appliances owned by the extracted user.

7 Claims, 21 Drawing Sheets

(56) References Cited

U.S. PATENT DOCUMENTS

| | | | | |
|---|---|---|---|---|
| 2011/0185342 A1* | 7/2011 | Argue | ............... | G06F 8/10 |
| | | | | 717/113 |
| 2013/0325568 A1* | 12/2013 | Mangalvedkar | ... | G06Q 30/0269 |
| | | | | 705/14.4 |
| 2015/0149298 A1* | 5/2015 | Tapley | ............... | G06Q 30/0633 |
| | | | | 705/14.66 |
| 2015/0278912 A1* | 10/2015 | Melcher | ............... | H04W 76/14 |
| | | | | 705/26.7 |
| 2015/0290795 A1* | 10/2015 | Oleynik | ............... | G05B 19/42 |
| | | | | 700/257 |
| 2015/0312348 A1* | 10/2015 | Lustgarten | ............... | H04L 67/12 |
| | | | | 705/14.66 |
| 2016/0042432 A1* | 2/2016 | Wenig | ............... | G06F 16/337 |
| | | | | 705/26.7 |
| 2016/0117691 A1* | 4/2016 | Lorenzini | ............ | G06Q 30/0201 |
| | | | | 705/7.29 |

FOREIGN PATENT DOCUMENTS

| | | |
|---|---|---|
| JP | 2003-091632 | 3/2003 |
| JP | 2010-114751 | 5/2010 |

* cited by examiner

| User ID | Contact information |
|---|---|
| UID1 | Name: Miki YAMADA |
|  | Address: 3-10, Fukushima Ward, Osaka City |
|  | E-mail address: yamada@aaa.com |
| UID2 | Name: Jiro SATO |
|  | Address: 1-19, Minato Ward, Tokyo Metropolis |
|  | E-mail address: sato@aaa.com |
| ... | ... |

401 (UID1 rows)
402 (UID2 rows)

FIG. 5

| Model ID | Model explanation | Notification target function information |
|---|---|---|
| 1 | First model (Automatic bread baker) | Rice flour bread making function<br>Wheat flour bread making function<br>Mochi making function |
| 2 | Second model (Microwave oven) | Okonomiyaki grill function<br>Cake oven function<br>Pasta boiling function<br>Chawanmushi making function |
| 3 | Third model (Air conditioner equipped with odor sensor) | Odor sensing function (okonomiyaki, grilled beef, grilled chicken, ⋯) |
| 4 | Fourth model (Ventilating fan) | Ventilation function |

FIG. 6
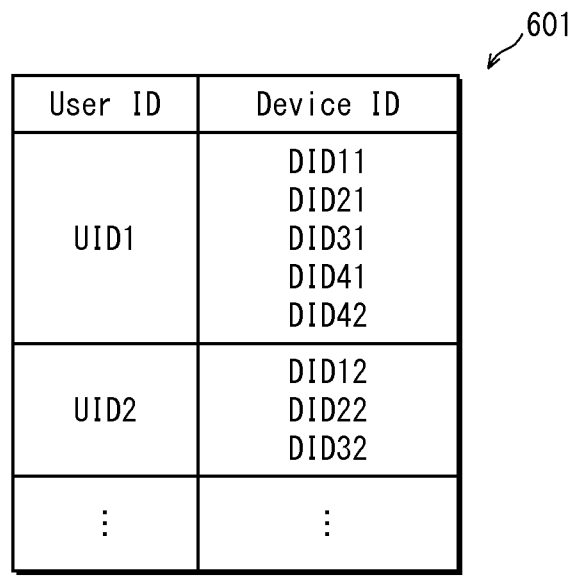
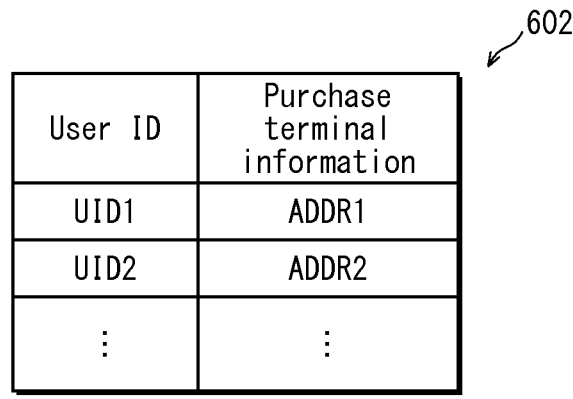

FIG. 7

| User ID | Device ID | Time information | Device generation information | |
|---|---|---|---|---|
| UID1 | DID11 | 2012/10/20 6:30 | Rice flour bread making function | ~701 |
| | | 2012/10/22 6:45 | Rice flour bread making function | |
| | | 2012/10/23 7:00 | Mochi making function | |
| | DID21 | 2012/10/21 12:00 | Pasta boiling function | |
| | | 2012/10/24 12:00 | Pasta boiling function | |
| UID2 | DID12 | 2012/10/20 6:00 | Rice flour bread making function | |
| | DID22 | 2012/10/20 12:00 | Okonomiyaki grill function | |
| | | 2012/10/21 12:00 | Cake oven function | |
| | | 2012/10/22 18:30 | Chawanmushi making function | |
| | DID32 | 2012/10/23 19:00 | Odor sensing function (okonomiyaki) | ~702 |
| | | 2012/10/24 19:20 | Odor sensing function (grilled beef) | |
| ⋮ | ⋮ | ⋮ | ⋮ | |

| User ID | Device ID | Time information | Device generation information |
|---|---|---|---|
| UID1 | DID41 | ⋮ | ⋮ |
| | | 2012/2/27 10:30 | Ventilation function |
| | | 2012/2/28 10:30 | Ventilation function |
| | | 2012/2/29 10:30 | Ventilation function |
| | | 2012/6/1 10:30 | Ventilation function |
| | | 2012/6/2 10:30 | Ventilation function |
| | | 2012/6/3 10:30 | Ventilation function |
| | | ⋮ | ⋮ |
| | DID42 | ⋮ | ⋮ |
| | | 2012/2/27 10:32 | Ventilation function |
| | | 2012/2/28 10:32 | Ventilation function |
| | | 2012/2/29 10:32 | Ventilation function |
| | | 2012/6/1 10:32 | Ventilation function |
| | | 2012/6/2 10:32 | Ventilation function |
| | | 2012/6/3 10:32 | Ventilation function |
| | | ⋮ | ⋮ |

FIG. 9

| Rule number | Model ID | Condition information | |
|---|---|---|---|
| 1 | 1 | Wheat flour bread making has not been performed | ←—911 |
| 2 | 2 | Okonomiyaki grill has not been performed | ←—912 |
| 3 | 3 | Odor of okonomiyaki has not been sensed by odor sensing function | ←—913 |

| Rule number | Model ID | Condition information | |
|---|---|---|---|
| 4 | 4 | Ventilation function has been used from March to May | ←—921 |
| 5 | 4 | Ventilation function has been executed a predetermined number of times or more for each of January, February, and June to December | ←—922 |

FIG. 10

| User ID | Contact information |
|---|---|
| 1 | Name: Miki YAMADA |
| | Address: 3-10, Fukushima Ward, Osaka City |
| | E-mail address: yamada@aaa.com |
| ... | ... |

| Rule number | Model ID | Condition information |
|---|---|---|
| 1 | 1 | Wheat flour bread making has not been performed |
| 2 | 2 | Okonomiyaki grill has not been performed |
| 3 | 3 | Odor of okonomiyaki has not been sensed by odor sensing function |
| 6 | 2 | Pasta boiling has not been performed |

| Model ID | Notification target function | Material |
|---|---|---|
| 1 | Rice flour bread making function | Rice |
| | | Salt |
| | | Sugar |
| | | Butter |
| | | ⋮ |
| | Wheat flour bread making function | Wheat |
| | | Salt |
| | | Sugar |
| | | Butter |
| | | ⋮ |
| | Mochi making function | Sticky rice |
| | | Salt |
| | | ⋮ |
| ⋮ | ⋮ | ⋮ |

FIG. 21A

| Model ID | Device generation information | Use point |
|---|---|---|
| 1 | Rice flour bread (normal) making function | 3 |
| | Rice flour bread (reduced salt) making function | 2 |
| | Wheat flour bread (normal) making function | 3 |
| | Wheat flour bread (reduced salt) making function | 2 |
| | Mochi making function | 1 |
| ⋮ | ⋮ | ⋮ |

FIG. 21B

| Rule number | Device ID | Condition |
|---|---|---|
| 10 | 1 | Total of use points per month is 10 or less |

ADVERTISEMENT DISTRIBUTION METHOD AND ADVERTISEMENT DISTRIBUTION SYSTEM

This application claims benefit to the provisional U.S. application No. 61/718,867 filed on Oct. 26, 2012.

TECHNICAL FIELD

The present invention relates to an art of selecting an advertisement distribution destination based on pieces of information collected from each of home appliances owned by a user.

BACKGROUND ART

There has been an art that a server collects, from each of home appliances (hereinafter, simply referred to as devices) owned by each of a plurality of users, pieces of execution information each indicating a function executed by the device and so on, and distributes an advertisement of a product relevant to the execution information to the user who owns the device (Patent Literature 1).

Since a function executed by a device has a high relevance to a user's preference, it is highly possible that the above art allows to distribute an advertisement of a product that matches the user's preference.

CITATION LIST

Patent Literature

[Patent Literature 1] Japanese Patent Application Publication No. 2002-298014

SUMMARY OF INVENTION

Technical Problem

Unfortunately, even with use of the above art, there is a case where an appropriate advertisement distribution destination cannot be determined depending on products such as products targeted for users who are allergic to a particular allergen. This is because there is a low relevance between life pattern of a user who refrains from taking in a particular allergen and a function executed by a device owned by the user.

The present invention was made in view of the above problem, and aims to provide an advertisement distribution method, unlike conventional methods, that is appropriate for determining an advertisement distribution destination of a product that has a low direct relevance to execution information collected from devices.

Solution to Problem

In order to solve the above problem, the present invention provides an advertisement distribution method that is executed by an advertisement distribution system that distributes an advertisement of a product to a user among a plurality of users who is expected to purchase the product, the advertisement distribution method comprising: a collecting step of collecting, from each of one or more of home appliances that are owned by each of the users, one or more pieces of execution information each indicating a function that has been executed by the home appliance; a detecting step of, with respect to each of the users, detecting an unused function that has not been used in each of the home appliances owned by the user by analyzing the pieces of execution information collected from the home appliance and functions included in the home appliance; and a transmitting step of extracting the user who is expected to purchase the product based on a result of the detection performed by the detection step, and transmitting the advertisement to one or more of the home appliances owned by the extracted user.

Advantageous Effects of Invention

With the above configuration, the advertisement distribution method relating to the present invention extracts an advertisement distribution destination of a product that has a low direct relevance to execution information from devices.

BRIEF DESCRIPTION OF DRAWINGS

FIG. 4 shows an example of a private information list stored in the management server.

FIG. 5 shows an example of a model information list stored in the management server.

FIG. 6 shows an example of a user-owned device list stored in the management server.

FIG. 7 shows an example of a device operation information list stored in the management server.

FIG. 8 shows an example of a device operation information list stored in the management server.

FIG. 9 shows an example of a rule information list stored in the management server.

FIG. 10 shows an example of an advertisement distribution destination information list stored in the management server.

FIG. 13 shows an example of rule information after update.

FIG. 20 shows a material information list relating to a modification of the present invention.

FIG. 21A shows an example of a point list relating to another modification of the present invention, and FIG. 21B shows an example of rule information relating to the other modification of the present invention.

DESCRIPTION OF EMBODIMENTS

1 Outline

Figure 1:
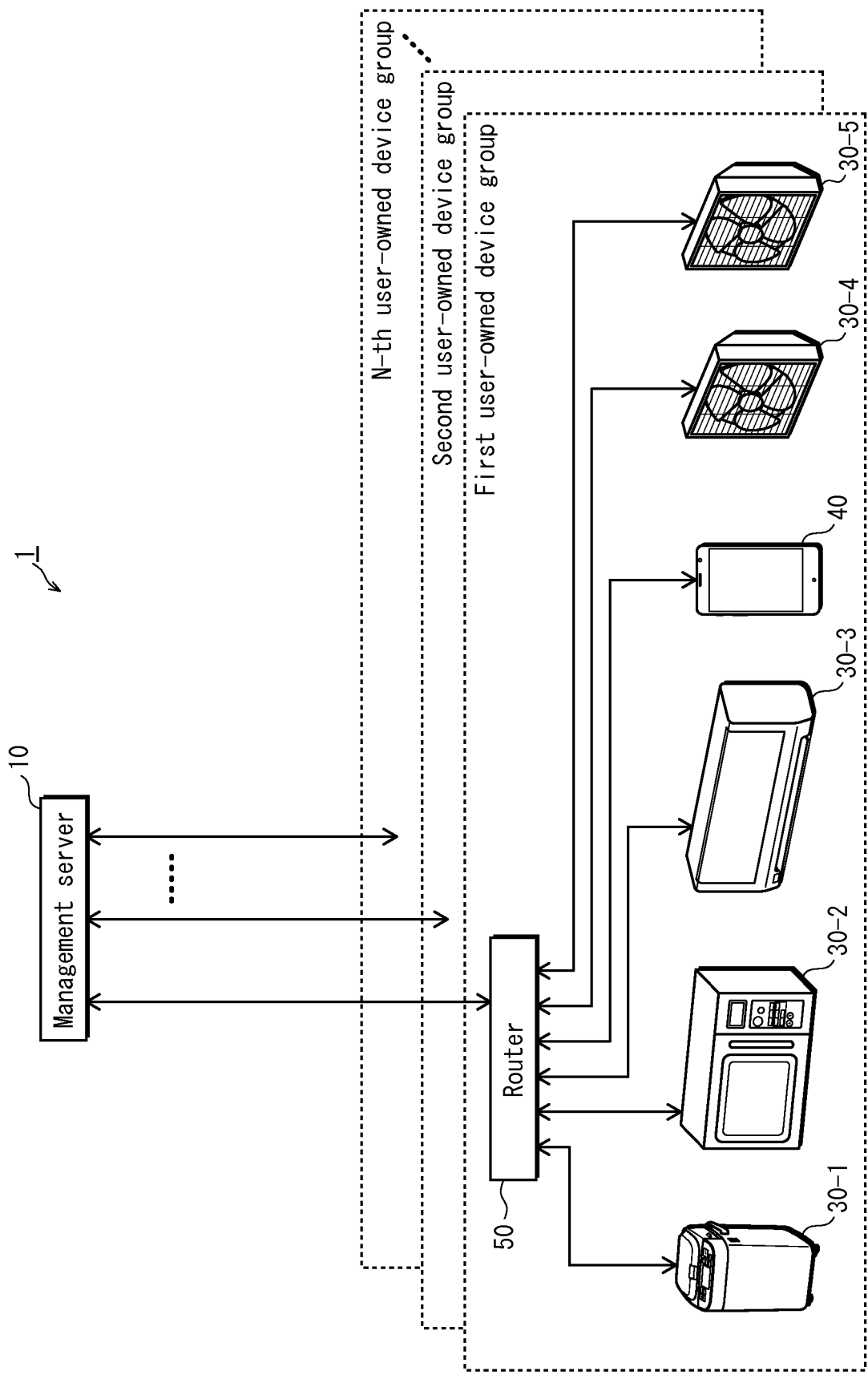
FIG. 1 shows configuration of an advertisement distribution system relating to an embodiment of the present invention.

The following explains an advertisement distribution system 1 relating to an embodiment of the present invention with reference to the drawings. The advertisement distribution system 1 is a system for selecting a user as an appropriate distribution destination of an advertisement among a plurality of users and distributing the advertisement to the selected user. As shown in FIG. 1, the advertisement distribution system 1 is composed of a management server 10, a first user-owned device group, a second user-owned device group, . . . , the N-th user-owned device group.

The first user-owned device group is a group of devices owned by a first user, and is composed of a first device 30-1, a second device 30-2, a third device 30-3, a fourth device 30-4, a fifth device 30-5, a purchase terminal 40, and a router 50. The second to the N-th user-owned device groups are respective groups of devices owned by the second to the N-th users, and are each composed of a plurality of devices, a purchase terminal, and a router, similarly to the first user-owned device group. Since the second to the N-th user-owned device groups perform similar operations to the first user-owned device group, the following explanation is given mainly on the first user-owned device group.

The first device 30-1, the second device 30-2, and the third device 30-3 are an automatic bread baker, a microwave oven, and an air conditioner equipped with an odor sensor, respectively. Also, the fourth device 30-4 and the fifth device 30-5 are each a ventilating fan. Each time the devices each execute a function included therein, the device generates information indicating the executed function (hereinafter, referred to as device generation information), and transmits the generated device generation information to the management server 10. The device generation information is information relating to the function executed by the device such as the function itself executed by the device and measurement results obtained through execution of the function by the device.

The management server 10 is a server device managed by an advertisement distributer. The advertisement distributer is requested by an advertiser to extract a user who is expected to purchase a product that is a target of an advertisement (hereinafter, referred to as advertisement target product) as an advertisement distribution destination and distribute the advertisement to the extracted user. Here, the advertisement target product is targeted for users who do not prefer (who avoid using) a specific material. The following explanation is based on assumption that the specific material is for example wheat flour, the user who does not prefer the specific material has wheat allergy, and the advertisement target product is a product manufactured using an alternative to the specific material, specifically, a millet flour cake for example that is manufactured using millet flour alternative to wheat flour.

Upon receiving an advertisement distribution request, the advertisement distributer operates an input device or the like included in the management server 10 to instruct the management server 10 to extract a user who does not prefer wheat flour as an advertisement distribution destination. The management server 10 stores beforehand therein rule information describing a condition for extracting users who do not prefer wheat flour. The management server 10 collects one or more pieces of device generation information transmitted from each device, detects a function that has not been used in the device (hereinafter, referred to as unused function), and extracts a user who is appropriate for an advertisement with use of this detection results and the rule information. Then, the management server 10 distributes the advertisement to one of devices owned by the extracted user.

2. Management Server 10

2-1. Configuration

Figure 2:
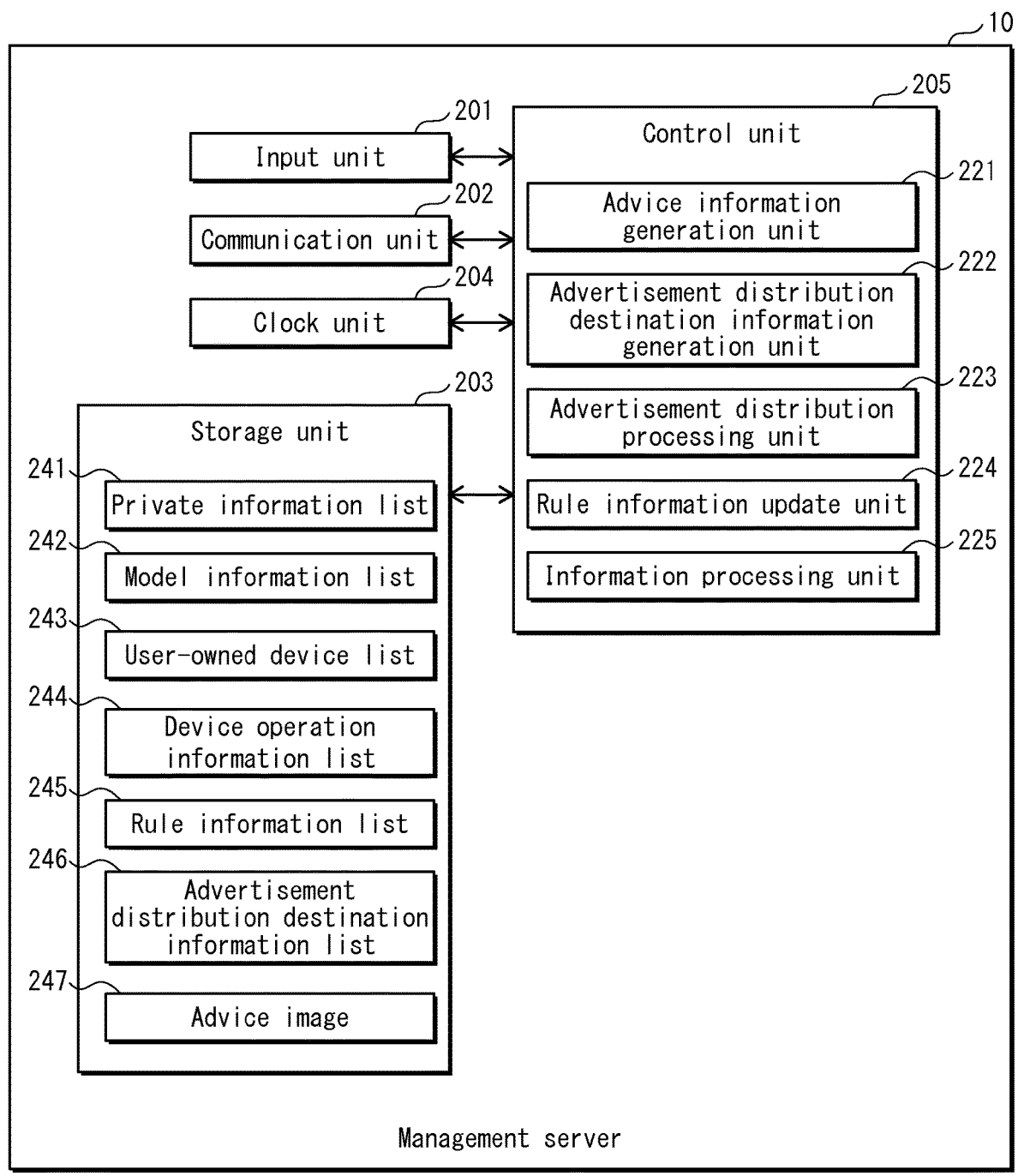
FIG. 2 is a block diagram showing configuration of a management server relating to the embodiment of the present invention.

The management server 10 is embodied as a computer, and includes an input unit 201, a communication unit 202, a storage unit 203, a clock unit 204, and a control unit 205, as shown in functional configuration in FIG. 2.

(1) Input Unit 201

The input unit 201 is embodied as an input device such as a keyboard. Also, the input unit 201 has a function of acquiring an instruction input by a user operating the keyboard or the like, and notifying the control unit 205 of the acquired instruction.

(2) Communication Unit 202

The communication unit 202 is embodied by an LSI for communication, and is connected to the router 50 via a network. The communication unit 202 has a function of performing transmission and reception of data with devices belonging to each of the user-owned device groups via the network and the router 50.

(3) Storage Unit

The storage unit 203 is embodied as a non-volatile storage medium such as a flash memory and a hard disk drive, and has a function of storing data. The storage unit 203 stores therein a private information list 241 (see FIG. 4), a model information list 242 (see FIG. 5), a user-owned device list 243 (see FIG. 6), a device operation information list 244 (see FIG. 7 and FIG. 8) that is a list of pieces of device operation information each including device generation information, a rule information list 245 (see FIG. 9), advertisement distribution destination information list 246 (see FIG. 10), and an advice image 247. These lists are detailed later.

(4) Clock Unit 204

The clock unit 204 is embodied as a real-time clock IC (Integrated Circuit), and has a function of time-keeping.

(5) Control Unit 205

The control unit 205 includes a processor and a memory, and has a function of controlling the whole operations of the management server 10. Here, functions of the control unit 205 are achieved by the processor executing a program stored in the memory.

The control unit 205 includes an advice information generation unit 221, an advertisement distribution destination information generation unit 222, an advertisement distribution processing unit 223, a rule information update unit 224, and an information processing unit 225, as shown in the function configuration in FIG. 2.

(5-1) Advice Information Generation Unit 221

Figure 11:
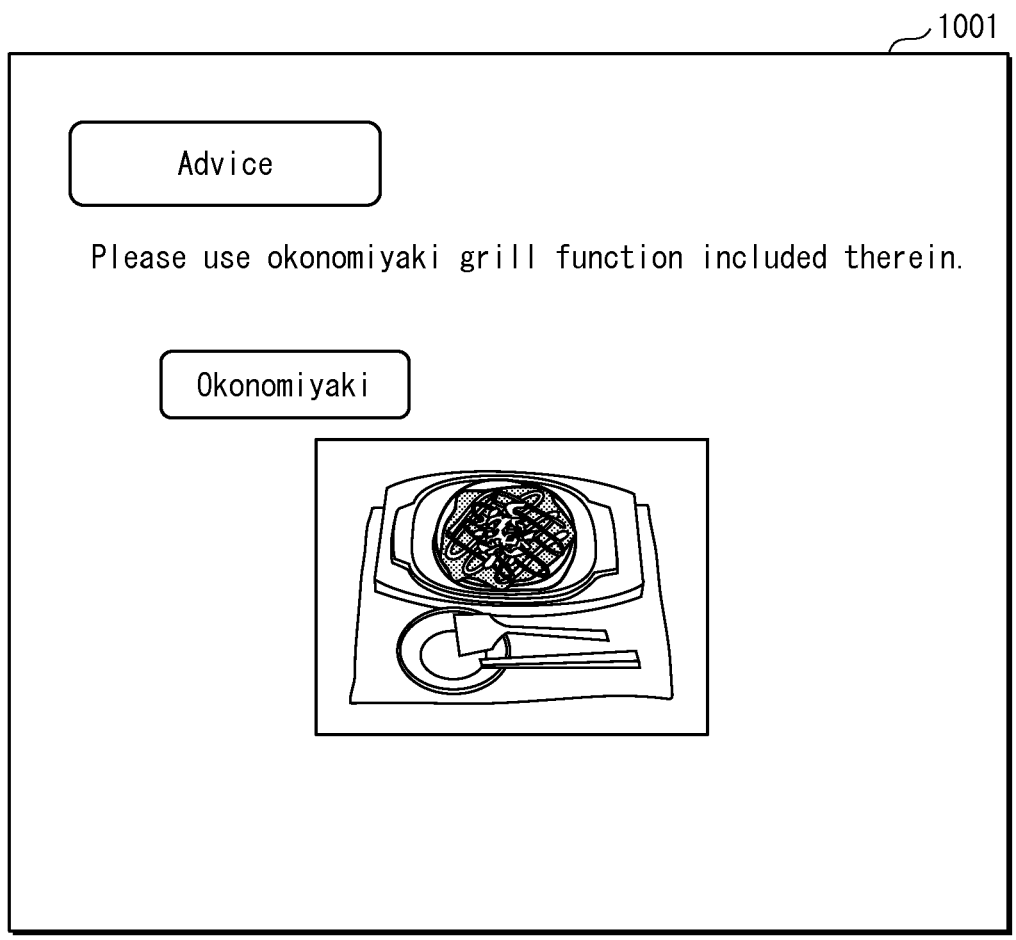
FIG. 11 shows an example of an advice image stored in the management server.

The advice information generation unit 221 has a function of generating advice information. Here, the advice information is information for notifying, in the case where a device includes an unused function, a user who owns this device of existence of the unused function. The advice information is for example information including an advice image 1101 that represents that a device includes an okonomiyaki (Japanese savory pancake) grill function such as shown in FIG. 11. In the case where a device has the okonomiyaki grill function but the okonomiyaki grill function has not been used, the advice image 1101 is displayed on a display or the like included in this device.

An advice image corresponding to each function is stored beforehand in the storage unit 203. The advice information generation unit 221 reads an advice image corresponding to an unused function from the storage unit 203, and generates advice information including the read advice image. Here, supplementary explanation is given on a purpose of transmission of advice information to the device. In the case where a device includes a function detected as an unused function, a reason why a user has not used this function is estimated to be (Reason 1) that a user hopes not to use this function or (Reason 2) that the user does not recognize that the device includes this function. It is possible to greatly reduce the case where the user does not use this function for Reason 2 by notifying the user of that the device includes this function. In other words, it is possible to increases a possibility that the device includes the unused function for Reason 1.

Figure 14:
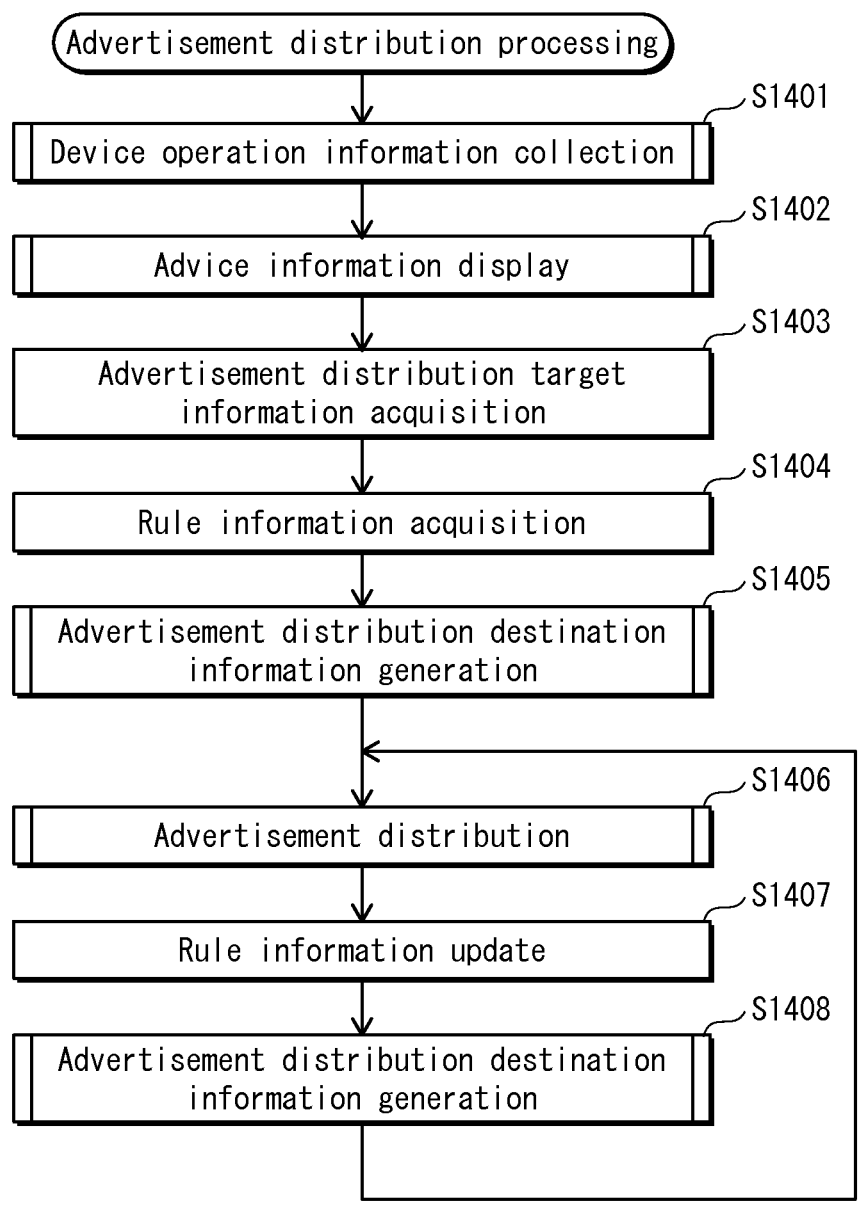
FIG. 14 is a flow chart showing a procedure of advertisement distribution processing.
Figure 16:
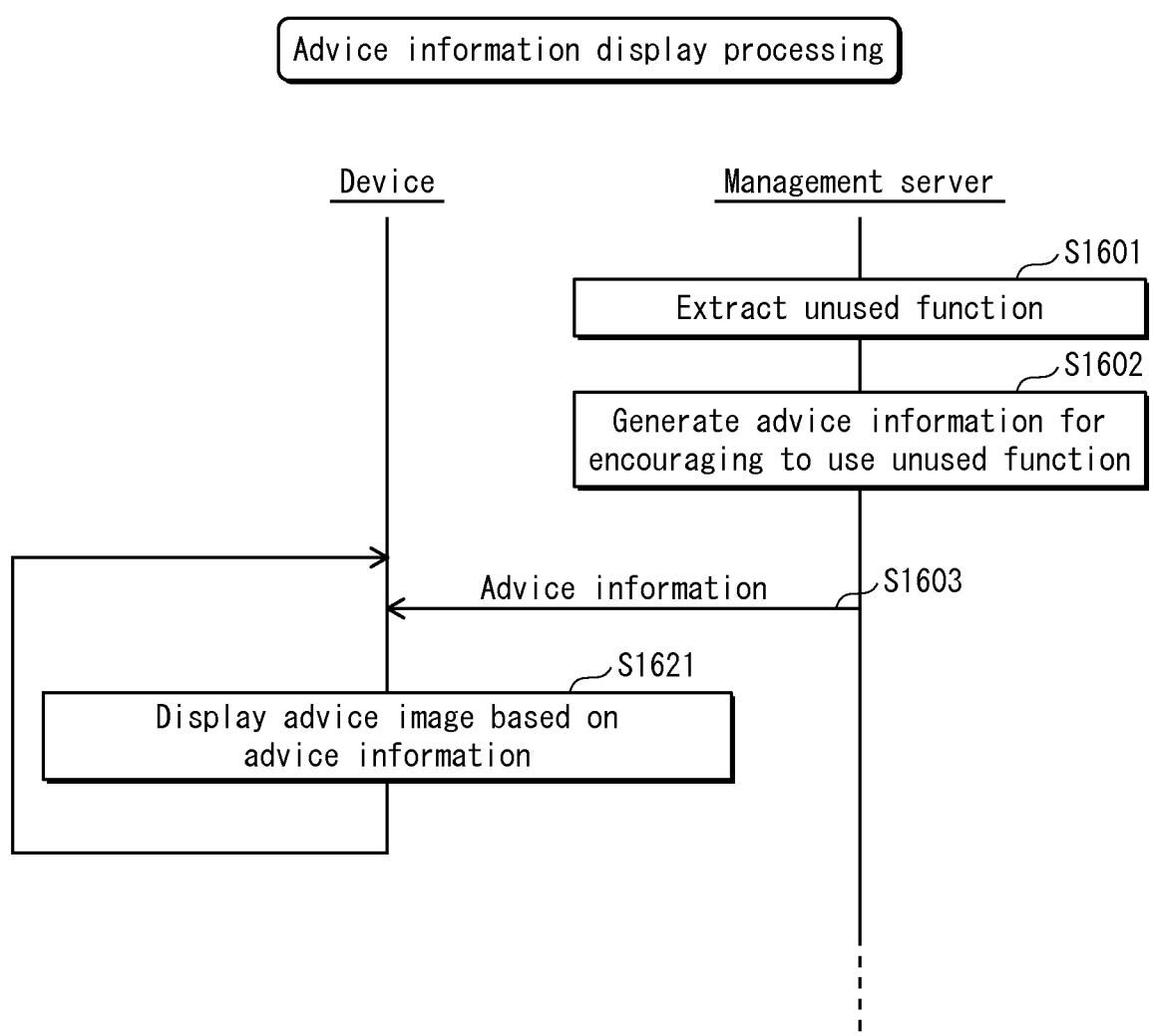
FIG. 16 is a flow chart showing a procedure of advice information display processing.

Processing performed by the advice information generation unit 221 corresponds to Step S1402 in FIG. 14 and Steps S1601 to S1603 in FIG. 16 that detail Step S1402.

(5-2) Advertisement Distribution Destination Information Generation Unit 222

The advertisement distribution destination information generation unit 222 has a function of generating the advertisement distribution destination information list 246. Here, the advertisement distribution destination information list 246 is a list of advertisement distribution destinations appropriate for an advertisement.

Figure 17:
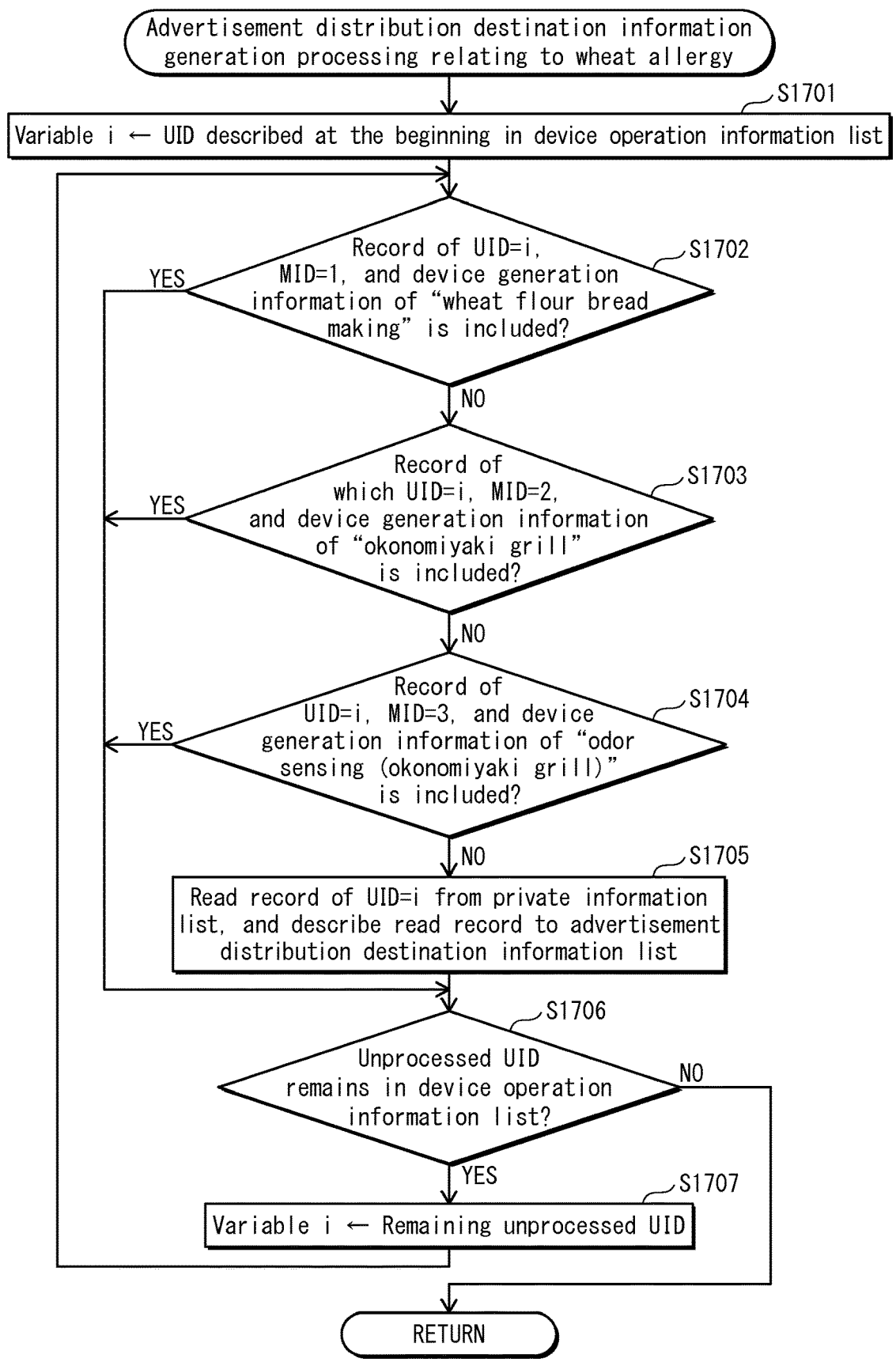
FIG. 17 is a flow chart showing a procedure of advertisement distribution destination information generation processing relating to wheat allergy.
Figure 18:
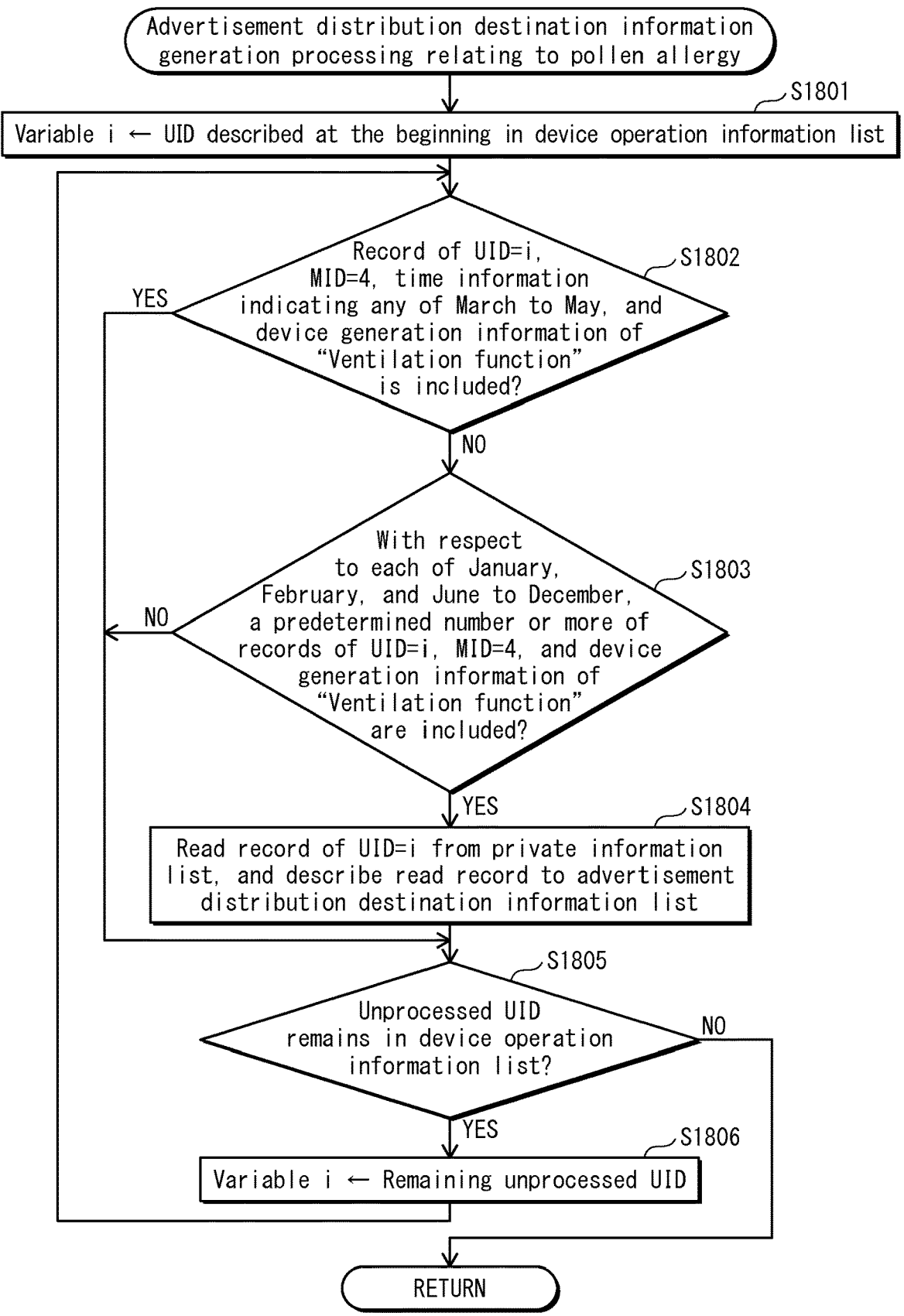
FIG. 18 is a flow chart showing a procedure of advertisement distribution destination information generation processing relating to pollen allergy.

The advertisement distribution destination information generation unit 222 generates the advertisement distribution destination information list 246 with use of rule information corresponding to the advertisement. Processing of generating the advertisement distribution destination information list 246 is shown in FIG. 17 and FIG. 18. FIG. 17 shows processing of extracting, as an advertisement distribution destination, a user with wheat allergy who is appropriate for an advertisement relating to millet flour cake. Also, FIG. 18 shows processing of extracting, as an advertisement distribution destination, a user with pollen allergy who is appropriate for an advertisement relating to pollen protection mask.

(5-3) Advertisement Distribution Processing Unit 223

Figure 12:
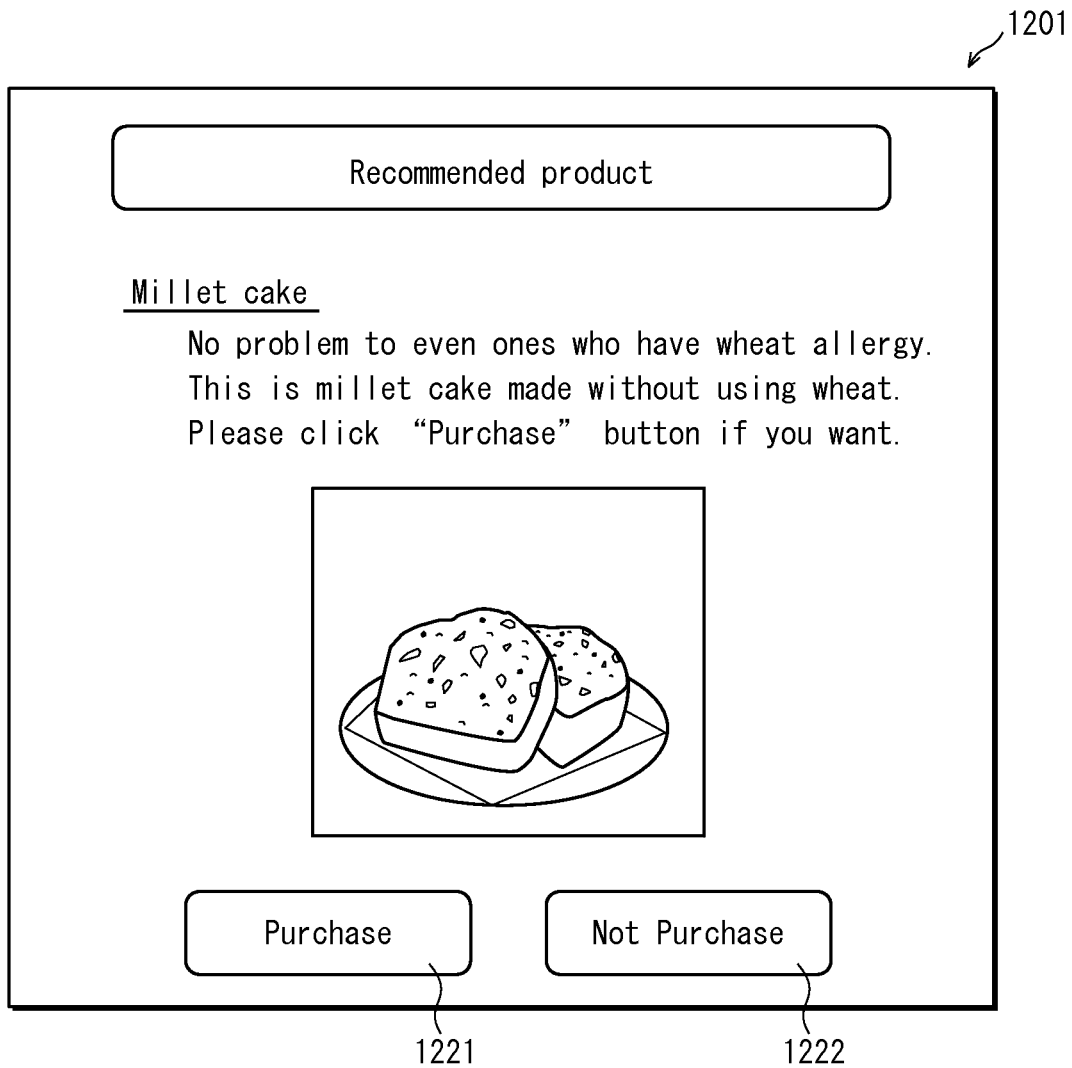
FIG. 12 shows an example of an advertisement image.

The advertisement distribution processing unit 223 has a function of performing advertisement distribution processing. Here, the advertisement distribution processing is processing of causing a device owned by a user, who is extracted by the advertisement distribution destination information generation unit 222, to display an advertisement image. The advertisement image is an image for promoting a user to purchase an advertisement target product, such as shown in FIG. 12. On an advertisement image 1201 shown in FIG. 12, a button 1221 representing "Purchase" and a button 1222 representing "Not Purchase" appear. The "Purchase" button has a URL (Uniform Resource Locator) of a website on which an advertisement target product is purchasable (hereinafter, referred to as purchase website) that is set as a link. In the case where the "Purchase" button is pressed by the user, a web browser of the device is redirected to the website indicated by the URL, and a home page image of the website is displayed on a display included in the device. Then, the user performs purchase processing of the advertisement target product on the website.

(5-4) Rule Information Update Unit 224

The rule information update unit 224 has a function of updating rule information in accordance with whether a user has purchased an advertisement target product which is advertised by the advertisement distribution processing unit 223. Rule information update processing corresponds to Step S1407 in FIG. 14.

(5-5) Information Processing Unit 225

The information processing unit 225 is a function unit that performs processing included in processing to be performed by the control unit 205, other than the processing performed by the advice information generation unit 221, the advertisement distribution destination information generation unit 222, the advertisement distribution processing unit 223, and the rule information update unit 224. The information processing unit 225 has, as primary functions, a device operation information collection function and a device registration function.

(A) Device Operation Information Generation Function

The information processing unit 225 acquires device operation information from each device, and generates time information indicating a current time counted by the clock unit 204 for each acquired piece of device operation information. Then, the information processing unit 225 describes the acquired device operation information and the generated time information into the device operation information list 244 in association with each other. Processing relating to the device operation information collection function corresponds to Step S1401 in FIG. 14 and processing in FIG. 15 that details Step S1401.

(B) Device Registration Function

The information processing unit 225 receives a registration request that is composed of a user ID and a device ID from the control unit 305 included in each device. The information processing unit 225 describes the user ID and the device ID into the user-owned device list 243 in association with each other.

2-2. Data Structure

The following explains the private information list 241, the model information list 242, the user-owned device list 243, the device operation information list 244, the rule information list 245, and the advertisement distribution destination information list 246 in this order.

(1) Private Information List 241

As shown in FIG. 4, the private information list 241 is a list of pieces of private information of users each who own a device included in the advertisement distribution system 1. The private information list 241 has been created beforehand by an advertisement distributer and stored in the storage unit 203. The users whose private information is described in the private information list 241 are candidates for an advertisement distribution destination.

The pieces of private information 401, 402, . . . , which are described in the private information list 241, each include a user ID and contact information. The contact information is composed of a user's name, address, and e-mail address. The user ID is identification information for identifying a user.

(2) Model Information List 242

As shown in FIG. 5, the model information list 242 is a list of pieces of information on a model of each device included in the advertisement distribution system 1 (hereinafter, referred to as model information). The model information includes a model ID, model explanation, and notification target function information in association with each other.

The model ID is identification information for identifying a model. Here, explanation is given on a relationship between a model ID and a device ID for identifying a device. Each device has allocated thereto a device ID for identifying the device. The device ID includes a model ID. Specifically, with respect to a device ID "DIDab" (a and b are each an integer), a character string "DID" is a prefix representing a device ID, a character "a" represents a model ID, and a character "b" represents an individual ID. The individual ID is an ID for individually identifying a device, and has allocated thereto a value such that the device ID is unique. In the case where a device has allocated thereto a device ID "DID21", this device is a model ID "2" and an individual ID "1".

The model explanation indicates a name of a model. A first model having a model ID "1" indicates an automatic bread baker. A second model having a model ID "2" indicates a microwave oven. A third model having a model ID "3" indicates an air conditioner equipped with an odor sensor. A fourth model having model ID "4" indicates a ventilating fan.

The notification target function information indicating functions that are each to be notified of execution of the function in the case where the function is executed by a device (hereinafter, referred to as notification target functions). Each device has a notification target function and functions other than the notification target function (for example, a function of turning power on and off). An advertisement distribution destination is extracted in accordance with whether the notification target function has been executed. The functions other than the notification target function are irrelevant to extraction of the advertisement distribution destination. Accordingly, no device generation information is generated in response to execution of such other function.

(3) User-Owned Device List 243

As shown in FIG. 6, the user-owned device list 243 is a list of pieces of information on devices owned by users whose private information is described in the private information list 241. The user-owned device list 243 is composed of a device list 601 and a purchase terminal list 602. The device list 601 describes user IDs and device IDs in association with each other, where each user ID is associated with a device ID that identifies a device owned by a user who is identified by the user ID. The purchase terminal list 602 describes the user IDs and pieces of purchase terminal information in association with each other. Here, the purchase terminal is a terminal used by a user for purchasing an advertisement target product. Also, the purchase terminal information is information for communicating with a purchase terminal owned by a user who is identified by an associated user ID. The purchase terminal information is for example an IP address (ADDR1 and ADDR2 in FIG. 6) of a purchase terminal.

(4) Device Operation Information List 244

As shown in FIG. 7 and FIG. 8, the device operation information list 244 is a list of pieces of device operation information that are received from each device and pieces of time information in association with each other. The device operation information includes a user ID, a device, and device generation information. The user ID is identification information that is allocated to a user who owns a device that has transmitted device operation information. The device ID is identification information that is allocated beforehand to the device that has transmitted the device operation information.

For example, device generation information 701 indicates that a function that has been executed by a device having a device ID "DID11" is a rice flour bread making function. Also, device generation information 702 indicates that an odor detection function has been executed by a device having a device ID "DID32" and odor of okonomiyaki has been detected as measurement results thereof. Although not illustrated in FIG. 7, the device generation information further includes information for distinguishing between information of the function itself executed by the device and the measurement results obtained through execution of the function.

The time information is information indicating a time that has been read by the control unit 205 at the time of acquisition of device operation information.

The device operation information list 244 is created and updated by the control unit 205. Each time receiving device operation information from a device, the control unit 205 reads a time from the clock unit 204, and describes the received device operation information and time information indicating the read time into the device operation information list 244 in association with each other.

(5) Rule Information List 245

The rule information list 245 is a list of pieces of rule information that are used for extracting a user who is appropriate for an advertisement among a plurality of users. The pieces of rule information one-to-one correspond to advertisements.

Rule information 901 that is an example of the rule information shown in FIG. 9 is rule information for extracting a user who is appropriate for an advertisement of millet flour cake. Here, the user, who is appropriate for the advertisement of millet flour cake, is assumed to be a user with wheat allergy. Based on this assumption, the rule information 901 is rule information for extracting a user who does not prefer wheat flour.

The rule information 901 includes one or more extraction rules (for example, extraction rules 911, 912, and 913). Also, these extraction rules each include a rule number, a model ID, and condition information in association with each other.

The rule number is a number for identifying an extraction rule (the extraction rules 911, 912, and 913). The model ID is an ID for identifying a model to which a condition indicated by the condition information is to be applied. The condition information indicates a condition to be satisfied by a device belonging to the model identified by the model ID. This condition information is compared with the device generation information, which is described in the device operation information list 244.

Rule information 902 is rule information for extracting a user who is appropriate for an advertisement of pollen protection mask. Here, the user, who is appropriate for the advertisement of pollen protection mask, is assumed to be a user with pollen allergy.

(6) Advertisement Distribution Destination Information List 246

The advertisement distribution destination information list 246 is a list of pieces of private information of users who appropriate for an advertisement, who are selected by the advertisement distribution destination information generation unit 222. Specifically as shown in FIG. 10, the advertisement distribution destination information list 246 describes part of pieces of private information of users who are appropriate for an advertisement that are extracted from the private information list 241.

3. First Device 30-1 to Fifth Device 30-5

Figure 3:
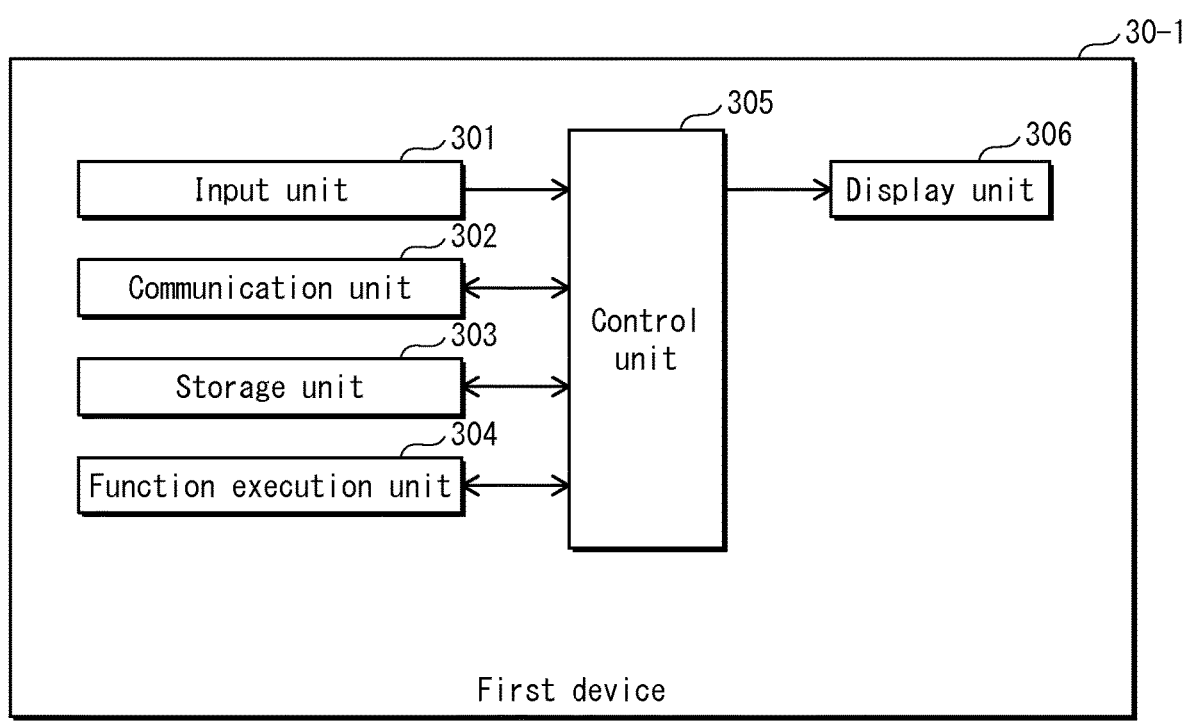
FIG. 3 is a block diagram showing configuration of a first device relating to the embodiment of the present invention.

The first device 30-1 is a home appliance owned by the first user, and includes an input unit 301, a communication unit 302, a storage unit 303, a function execution unit 304, a control unit 305, and a display unit 306, as shown in FIG. 3. Also, the second device 30-2 to the fifth device 30-5 are each a home appliance owned by the first user, and have the same configuration as the first device 30-1. Note that the function execution unit 304 is a function unit that executes a function unique to each device (a rice flour bread making function of an automatic bread baker, a food warming function of a microwave oven, and so on), and accordingly performs different processing for each model. Accordingly, the following explanation is given mainly on the first device 30-1, and supplementary explanation is appropriately given on the second device 30-2 to the fifth device 30-5 as necessary.

(1) Input Unit 301

The input unit 301 is composed of an input device such as a remote controller, a light reception unit of a remote control signal, a touch panel, a key pad, and a mechanical switch. The input unit 301 has a function of acquiring a user instruction input by a user operating the input device, and notifying the control unit 305 of the acquired user instruction.

(2) Communication Unit 302

The communication unit 302 is embodied as a communication LSI. The communication unit 302 has a function of transmitting and receiving data to and from the management server 10 via the router 50 and a network.

(3) Storage Unit

The storage unit 303 is embodied as a non-volatile storage medium such as a flash memory and a hard disk drive, and has a function of storing data. The storage unit 303 stores therein information necessary for operations thereof such as various types of setup information designated by a user (for example, set temperature information on air conditioners). Also, the storage unit 303 stores therein a device ID of a device including the storage unit 303 and a user ID for identifying a user who owns the device.

Here, at manufacturing of devices, a device ID is allocated to each of the devices and is stored in the storage unit 303 included in the device. A user ID has not been stored in the storage unit 303 at manufacturing of the device. The user ID is notified of the control unit 305 included in the device by a user who owns the device using the input unit 301 included in the device. Upon receiving notification of the user ID, the control unit 305 writes the user ID into the storage unit 303. Note that a user ID is allocated to each user by an advertisement distributer or the like who manages the advertisement distribution system 1. The user is notified of the allocated user ID by an advertisement distributer via mail, network communication, or the like.

(4) Function Execution Unit 304

The function execution unit 304, which is included in each of the first device 30-1 to the fifth device 30-5, is a function unit that achieves the function unique to the device. The function execution unit 304 achieves a different function for each of the first device 30-1 to the fifth device 30-5. Each time executing a function, the function execution unit 304 generates device generation information indicating the executed function, and transmits the generated device generation information to the control unit 305. As explained above, the device generation information is information on the function executed by the function execution unit 304, which indicates the function itself executed by the device or measurement results obtained through execution of the function by the device.

The function execution unit 304 stores beforehand therein notification target function information. When executing a function that is indicated by the notification target function information, the function execution unit 304 notifies the control unit 305 of device generation information. When executing a function that is not indicated by the notification target function information, the function execution unit 304 notifies the control unit 305 of no information. Note that the notification target function information, which is stored in the function execution unit 304, is the same as the notification target function information, which is associated with a model ID identifying a model to which the device including the function execution unit 304 belongs in the model information list 242.

The following explains functions of the function execution unit 304 for each device.

(A) First Device 30-1

The first device 30-1 is an automatic bread baker as explained above. The function execution unit 304 included in this device achieves for example a rice flour bread making function, a wheat flour bread making function, a mochi (Japanese rice cake) making function, a udon (Japanese wheat flour noodle) making function, a pasta making function, and so on. Note that, in addition to the above functions, the first device 30-1 has functions general automatic bread bakers have, and the function execution unit 304 included therein performs these functions, too.

(B) Second Device 30-2

The second device 30-2 is a microwave oven as explained above. The function execution unit 304 included in the second device 30-2 for example achieves an okonomiyaki grill function, a hamburger grill function, a cake oven function, a cream puff oven function, a pasta boiling function, a chawanmushi (Japanese egg custard) making function, a food warming function, a food thawing function, and so on. Note that, in addition to the above functions, the second device 30-2 has functions general microwave ovens have, and the function execution unit 304 included therein performs these functions, too.

(C) Third Device 30-3

The third device 30-3 is an air conditioner equipped with an odor sensor as explained above. The function execution unit 304 included in this device achieves for example an air cooling function, an air heating function, a temperature setting function, a wind direction setting function, a wind strength setting function, an odor sensing function, and so on. The odor sensing function is achieved by an odor sensor of the function execution unit 304 included in this device. The odor sensor is capable of sensing a plurality of predetermined sensing target odors such as odor of okonomiyaki, odor of grilled beef, and odor of grilled chicken. When executing the odor sensing function, the function execution unit 304 notifies the control unit 305 of that which one of the sensing target odors has been sensed by the odor sensing function. Note that, in addition to the above functions, the third device 30-3 has functions general air conditioners have, and the function execution unit 304 included therein performs these functions, too.

(D) Fourth Device 30-4 and Fifth Device 30-5

The fourth device 30-4 is a ventilating fan as explained above. The function execution unit 304 included in this device achieves for example a ventilation function. Note that, in addition to the above function, the fourth device 30-4 has functions general ventilating fans have, and the function execution unit 304 included therein performs these functions, too.

Also, the fifth device 30-5 is a device belonging to the same model as the fourth device 30-4. The configuration of the function execution unit 304 included in the fifth device 30-5 is the same as the configuration of the function execution unit 304 included in the fourth device 30-4.

(5) Control Unit 305

The control unit 305 includes a processor and a memory, and has a function of controlling the whole operations of the first device 30-1. Functions of the control unit 305 are achieved by the processor executing a program stored in the memory. The following explains primary functions of the control unit 305.

(A) Device Operation Information Generation Function

The control unit 305 receives device generation information indicating an executed function from the function execution unit 304. The control unit 305 generates device operation information that is composed of the received device generation information, and a user ID and a device ID which are stored in the storage unit 303. The control unit 305 transmits the generated device operation information to the management server 10 using the communication unit 302.

(B) Registration Request Function

The control unit 305 transmits a registration request including a user ID and a device ID which are stored in the storage unit 303 to the management server 10.

(6) Display Unit 306

The display unit 306 is composed of a display and a display control LSI. The display is for example a liquid crystal display. The display control LSI has a function of acquiring data representing an image that is to be displayed such as a menu image from the control unit 305 and the function execution unit 304, and displaying the image represented by the acquired data on the display. Note that the display unit 306 does not necessarily need to be included in each of all devices.

4. Purchase Terminal 40 and Router 50

The purchase terminal 40 is a smartphone as explained above, and has a primary function of connecting to a website on which commerce transactions are available via a network and performing product purchase processing. The product purchase processing performed by the purchase terminal 40 corresponds to Steps S1921 to S1926 in FIG. 19.

In the product purchase processing, upon receiving advertisement information transmitted from the management server 10, the purchase terminal 40 generates an advertisement image represented by the received advertisement information (for example, the advertisement image 1201 in FIG. 12), and displays the generated advertisement image on the display included therein.

With reference to the advertisement image displayed on the purchase terminal 40, a user determines whether to purchase an advertisement target product appearing on the advertisement image, and operates the purchase terminal 40 to press either one of the "Purchase" button and the "Not Purchase" button appearing on the advertisement image. When the "Purchase" button is pressed, the purchase terminal 40 transmits purchase result information indicating "Intention to purchase" to the management server 10. When the "Not Purchase" button is pressed, the purchase terminal 40 transmits purchase result information indicating "No intention to purchase" to the management server 10. Note that the purchase terminal 40 has functions general smartphones have, in addition to the above function.

The router 50 is a device that interconnects different networks. As shown in FIG. 1, in the advertisement distribution system 1, the router 50 interconnects a network outside the first user's home to which the management server 10 belongs and a network inside the first user's home to which the first device 30-1 to the fifth device 30-5 belong. In the following explanation, although not explicitly explained, communication between the management server 10 and each of the first device 30-1 to the fifth device 30-5 is performed via the router 50.

5. Operations 5-1. Advertisement Distribution Processing

The following explains advertisement distribution processing. As shown in FIG. 14, the advertisement distribution processing includes, device operation information collection processing (Step S1401), advice information display processing (Step S1402), advertisement distribution target information acquisition processing (Step S1403), rule information acquisition processing (Step S1404), advertisement distribution destination information generation processing (Step S1405), advertisement distribution processing (Step S1406), rule information update processing (Step S1407), and advertisement distribution destination information generation processing (Step S1408).

In the device operation information collection processing in Step S1401, each time device operation information is transmitted from each device, the information processing unit 225 included in the management server 10 acquires the transmitted device operation information, and describes the acquired device operation information into the device operation information list 244 (see FIG. 7 and FIG. 8) stored in the storage unit 203. The device operation information collection processing is detailed in FIG. 15. The device operation information collection processing is processing that is always performed irrespective of whether an advertisement distributer has received an advertisement distribution request.

In the advice information display processing in Step S1402, in the case where a device owned by a user includes an unused function, information for encouraging the user to use the unused function is displayed on one of devices owned by the user. The advice information display processing is detailed in FIG. 16.

In the advertisement target information acquisition processing in Step S1403, the management server 10 acquires specification information for specifying a user to be extracted as an advertisement distribution destination. Specifically, an advertisement distributer, who has received an advertisement distribution request, operates the input unit 201 to input specification information indicating "a user who does not prefer wheat flour" to the management server 10.

In the rule information acquisition processing in Step S1404, the control unit 205 included in the management server 10 reads rule information corresponding to the specification information acquired in Step S1403 from the rule information list 245 stored in the storage unit 203.

In the advertisement distribution destination information generation processing in Step S1405, the advertisement distribution destination information generation unit 222 included in the management server 10 extracts a user as an advertisement distribution destination, based on the device operation information list 244 collected in the Step S1401 and the rule information acquired in Step S1404. The advertisement distribution destination information generation processing is detailed in FIG. 17 and FIG. 18.

In the advertisement distribution processing in Step S1406, the management server 10 transmits advertisement information including an advertisement image to one or more of devices owned by the user as the advertisement distribution destination, owns (for example, the purchase terminal 40). Upon receiving the advertisement information, the user performs purchase processing of an advertisement target product, with reference to the advertisement image displayed on the purchase terminal 40. In this advertisement distribution processing, the management server 10 acquires purchase result information indicating whether the advertisement target product has actually been purchased from the purchase terminal 40. The advertisement distribution processing is detailed in FIG. 19.

In the rule information update processing in Step S1407, the management server 10 performs rule information update processing of correcting an error of rule information to update the rule information with use of the acquired purchase result information. The rule information update processing is detailed later.

The advertisement distribution destination information generation processing in Step S1408 is the same as the processing in Step S1405. Note that there is a case the rule information is updated prior to the processing in Step S1408. In the case where distribution of an advertisement relating to the same specification information as the specification information specified in Step S1403 is newly requested, advertisement distribution destination information is generated with use of the updated rule information. Then, the advertisement distribution processing (Step S1406) is performed, and the rule information update processing (Step S1407) is performed with use of results of the advertisement distribution processing. In this way, a loop of Steps S1406 to S1408 is repeated.

5-2. Device Operation Information Collection Processing

Figure 15:
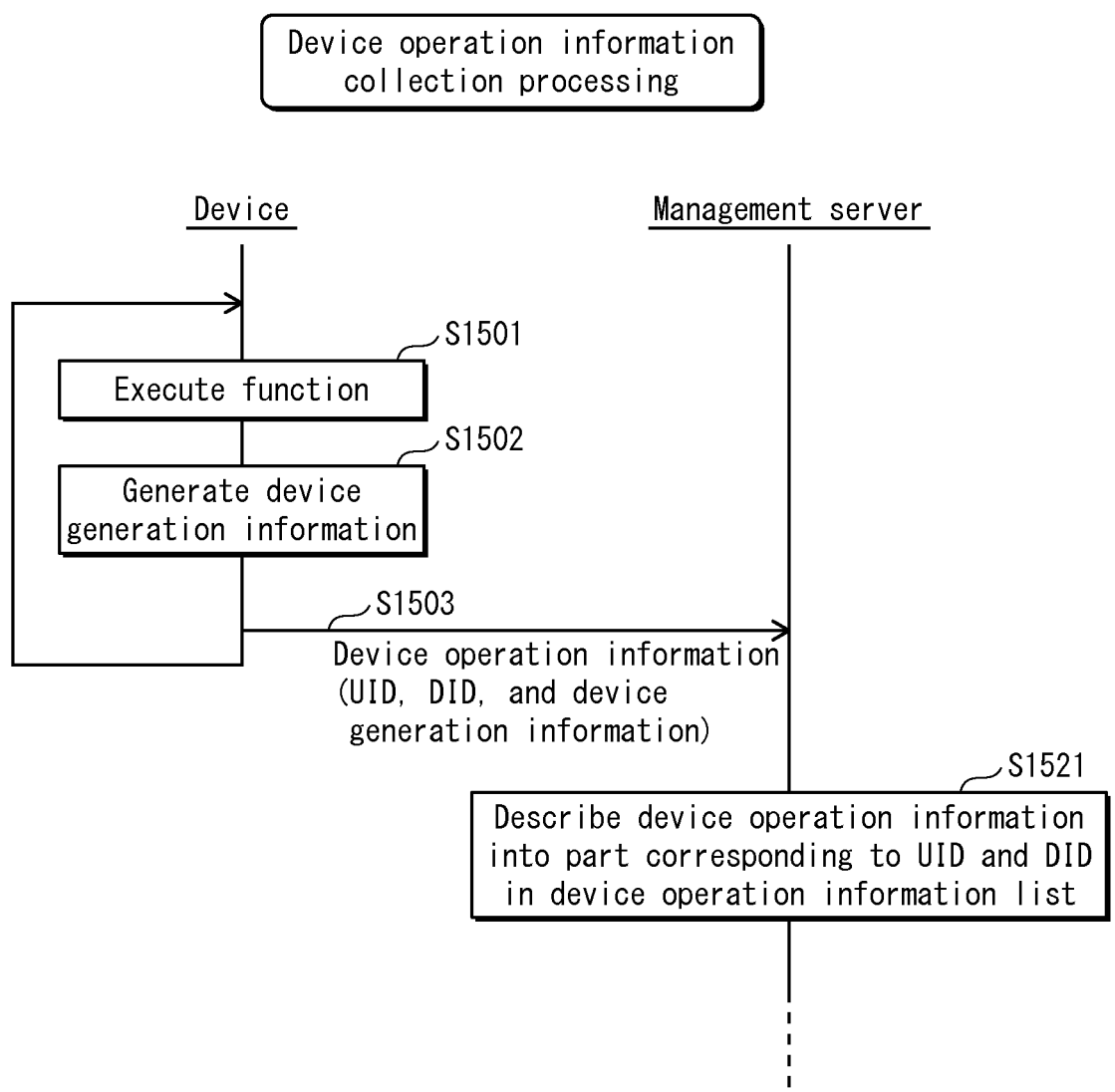
FIG. 15 is a flow chart showing a procedure of device operation information collection processing.

The following details the device operation information collection processing in Step S1401 with reference to FIG. 15.

In Step S1501, each time executing a function, the function execution unit 304 included in a device generates device generation information indicating the executed function, and transmits the generated device generation information to the control unit 305.

In Step S1502, the control unit 305 reads a user ID and a device ID from the storage unit 303, and generates device operation information that is composed of the read user ID and device ID and the received device generation information.

In Step S1503, the control unit 305 transmits the generated device operation information to the management server 10 using the communication unit 302. The management server 10 receives the device operation information.

In Step S1521, the management server 10 describes the received device operation information into part corresponding to the received user ID and device ID in the device operation information list 244 stored in the storage unit 203.

5-3. Advice Information Display Processing

The following details the advice information display processing in Step S1402 with reference to FIG. 16.

In Step S1601, the advice information generation unit 221 included in management server 10 extracts an unused function included in each device owned by each user. The unused function is extracted through analysis of the model information list 242 and the device operation information list 244. Specifically, for each device owned by the user, the advice information generation unit 221 reads notification target function information that is associated with a model to which the device belongs in the model information list 242. Then, the advice information generation unit 221 extracts, as an unused function, a function that is not indicated by the device generation information of the device operation information list 244, among functions indicated by the notification target function information.

In Step S1602, the advice information generation unit 221 generates advice information for encouraging the user to use the unused function extracted in Step S1601.

In Step S1603, the advice information generation unit 221 transmits the generated advice information to the device with respect to which the unused function is extracted. The device, with respect to which the unused function is extracted, receives the advice information.

In Step S1621, the device, which has received the advice information, generates an advice image based on the advice information, and causes the display unit 306 to display the generated advice image.

5-4. Advertisement Distribution Destination Information Generation Processing Relating to Wheat Allergy The following explains the advertisement distribution destination information generation processing relating to wheat allergy, with reference to FIG. 17. FIG. 17 shows a procedure of generating advertisement distribution destination information based on the rule information 901 shown in FIG. 9.

In Step S1701, the control unit 205 included in the management server 10 assigns a user ID that is described at the beginning in the device operation information list 244 to a variable i. In the case of the device operation information list 244 shown in FIG. 7 for example, UID1 is assigned to the variable i.

In Step S1702, the control unit 205 judges whether the device operation information list 244 includes a record in which UID=i, MID=1, and device generation information of "wheat flour bread making" are described. When the record is included (Step S1702: YES), the control unit 205 proceeds to Step S1706. When the record is not included (Step S1702: NO), the control unit 205 proceeds to Step S1703. The processing in Step S1702 is processing of making a judgment on a condition indicated by the condition information described in the extraction rule 911 included in the rule information 901.

In Step S1703, the control unit 205 judges whether the device operation information list 244 includes a record in which UID=i, MID=2, and device generation information of "okonomiyaki grill" are described. When the record is included (Step S1703: YES), the control unit 205 proceeds to Step S1706. When the record is not included (Step S1703: NO), the control unit 205 proceeds to Step S1704. The processing in Step S1703 is processing of making a judgment on a condition indicated by the condition information described in the extraction rule 912 included in the rule information 901.

In Step S1704, the control unit 205 judges whether the device operation information list 244 includes a record in which UID=i, MID=3, and device generation information of "odor sensing (okonomiyaki grill)" are described. When the record is included (Step S1704: YES), the control unit 205 proceeds to Step S1706. When the record is not included (Step S1704: NO), the control unit 205 proceeds to Step S1705. The processing in Step S1704 is processing of making a judgment on a condition indicated by the condition information described in the extraction rule 913 included in the rule information 901.

In Step S1705, the control unit 205 reads a record of UID=i from the private information list 241, and describes the read record into the advertisement distribution destination information list 246.

In Step S1706, the control unit 205 judges whether any unprocessed UID remains in the device operation information list 244. When any unprocessed UID does not remain (Step S1706: NO), the processing ends. When any unprocessed UID remains (Step S1706: YES), the control unit 205 proceeds to Step S1707.

In Step S1707, the control unit 205 assigns the remaining unprocessed UID to the variable i, and then proceeds to Step S1702.

Through the above processing, it is possible to extract, as an advertisement distribution destination, a user who is estimated to have wheat allergy based on that the user satisfies the following conditions: although the user owns an automatic bread baker having the wheat flour bread making function, the user has not used the wheat flour bread making function; although the user owns a microwave oven having the okonomiyaki grill function for making okonomiyaki whose raw material is wheat flour, the user has not used the okonomiyaki grill function; and odor of okonomiyaki has not been detected by an air conditioner equipped with an odor sensor owned by the user.

5-5. Advertisement Distribution Destination Information Generation Processing Relating to Pollen Allergy The above explanation has been given on the case where a user who does not prefer wheat flour as a specific material is extracted as an advertisement distribution destination, and a millet flour cake that is made using an alternative (millet flour) to the specific material is determined as an advertisement target product. However, the advertisement target product is not limited to an alternative to the specific material, and any product for avoiding the specific material. In the case where the specific material is for example pollen, the advertisement target product may be a pollen protection mask, and a user with pollen allergy may be extracted as an advertisement distribution destination.

The following explains the advertisement distribution destination information generation processing relating to pollen allergy, with reference to FIG. 18. FIG. 18 shows a procedure of generating advertisement distribution destination information based on the rule information 902 shown in FIG. 9.

Processing in Steps S1801 and S1804 to S1806 shown in FIG. 18 is the same as the processing in Steps S1701 and S1705 to S1707 shown in FIG. 17, respectively, and accordingly explanation thereof is omitted. The following explanation is given on only Steps S1802 and S1803.

In Step S1802, the control unit 205 included in the management server 10 judges whether the device operation information list 244 includes a record in which UID=i, MID=4, time information indicating any of March to May, and device generation information of "ventilation" are described. When the record is described (Step S1802: YES), the control unit 205 proceeds to Step S1805. When the record is not described (Step S1802: NO), the control unit 205 proceeds to Step S1803. The processing in Step S1802 is processing of making a judgment on a condition indicated by condition information described in an extraction rule 921 included in the rule information 902.

In Step S1803, the control unit 205 included in the management server 10 judges whether the device operation information list 244 includes a predetermined number or more of records in which UID=i, MID=4, time information indicating each of January, February, June to December, and device generation information of "ventilation" are described. When the predetermined number or more of records are described (Step S1803: YES), the control unit 205 proceeds to Step S1804. When the predetermined number or more of records are not described (Step S1803: NO), the control unit 205 proceeds to Step S1805. The processing in Step S1803 is processing of making a judgment on a condition indicated by condition information described in an extraction rule 922 included in the rule information 901.

Through the above processing, it is possible to extract, as an advertisement distribution destination, a user who is estimated to have pollen allergy based on that the user prevents intrusion of pollen into a house by not using a ventilating fan for a period in a single year in which an amount of pollen is large (March to May), and uses the ventilating fan for ventilation for a remaining period in the single year.

5-6. Advertisement Distribution Processing

Figure 19:
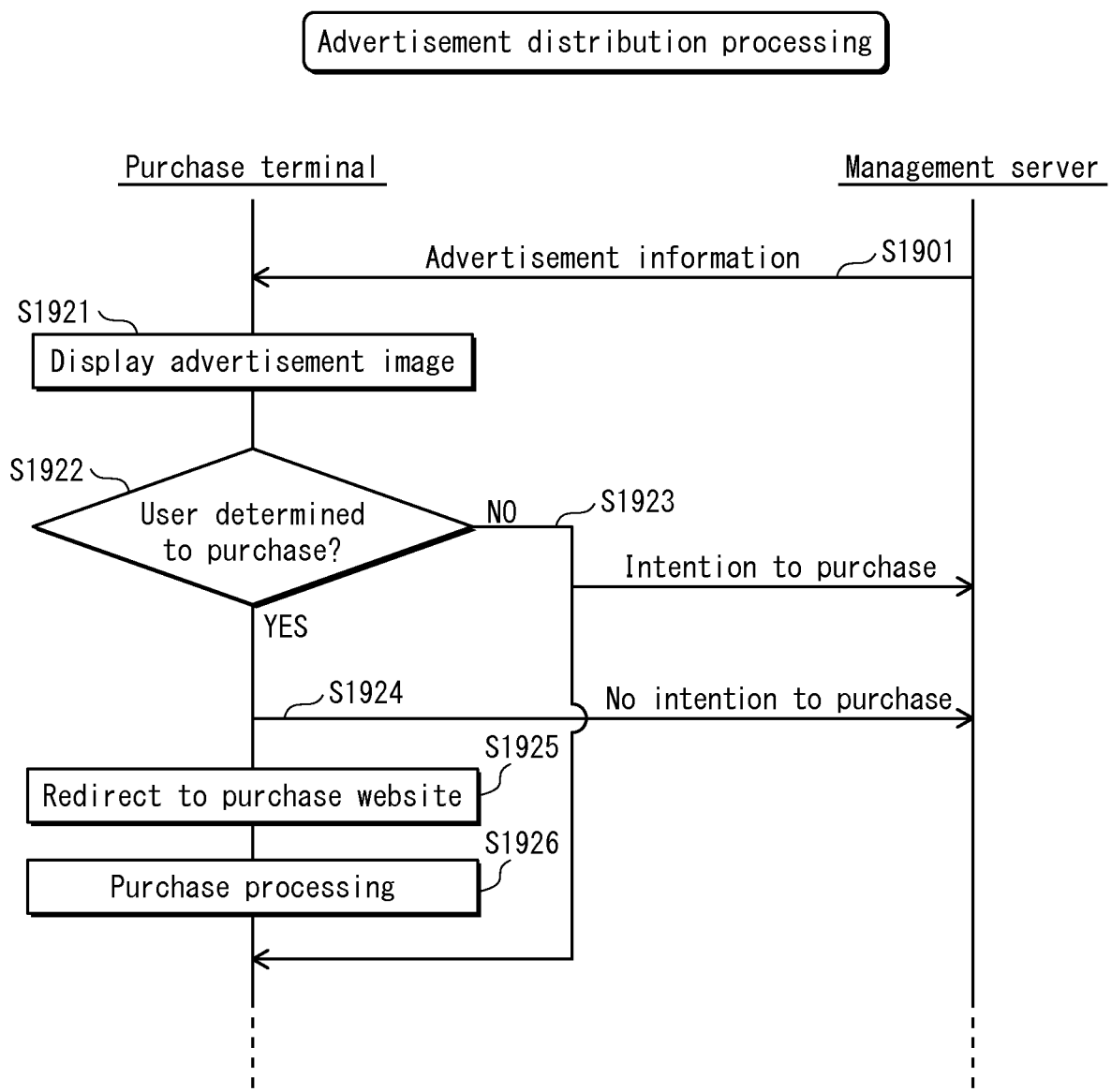
FIG. 19 is a flow chart showing a procedure of advertisement distribution processing.

The following explains the advertisement distribution processing performed by the management server 10 and the purchase terminal 40, with reference to FIG. 19.

In Step S1901, the advertisement distribution processing unit 223 included in the management server 10 transmits advertisement information to the purchase terminal 40. The advertisement information is information for advertising an advertisement target product to a user. The advertisement information for example includes the advertisement image 1201. Here, one-to-one association between users and the purchase terminals 40 is described in the purchase terminal list 602. The control unit 305 included in the purchase terminal 40 receives the advertisement information.

In Step S1921, the control unit 305 included in the purchase terminal 40 generates an advertisement image based on the received advertisement information, and causes the display unit 306 to display the generated advertisement image.

In Step S1922, with reference to the advertisement image displayed on the display unit 306, the user determines whether to purchase an advertisement target product appearing on the advertisement image. When determining to purchase the advertisement target product, the user inputs a purchase instruction via the input unit 301 included in the purchase terminal 40. This purchase instruction is input for example by the user pressing the "Purchase" button appearing on the advertisement image. On the other hand, when determining not to purchase the advertisement target product, the user inputs a no-purchase instruction via the input unit 301 included in the purchase terminal 40. This no-purchase instruction is input for example by the user pressing "Not Purchase" button appearing on the advertisement image. The input unit 301 notifies the control unit 305 of the input purchase instruction or no-purchase instruction.

When receiving the no-purchase instruction (Step S1922: NO), the control unit 305 transmits purchase result information indicating "No intention to purchase" to the management server 10 (Step: S1923), and ends the processing. On the other hand, when receiving the purchase instruction (Step S1922: YES), the control unit 305 transmits purchase result information indicating "Intention to purchase" to the management server 10 (Step S1924).

Here, the "Purchase" button appearing on the advertisement image 1201 has a URL of a purchase website that is set as a link. When the "Purchase" button is pressed, a web browser of the device is redirected to the website indicated by the URL (Step S1925), and the display unit 306 displays a home page image of the website.

In Step S1926, the user performs purchase processing. Processing of purchasing a product on a purchase website is known, and accordingly explanation thereof is omitted.

5-7. Rule Information Update Processing

The following details the rule information update processing in Step S1407. Upon receiving purchase result information indicating "No intention to purchase" form the purchase terminal 40, the rule information update unit 224 included in the management server 10 estimates that rule information has an error, and performs the rule information update processing.

In the case where there is device generation information: (a) that is collected from a device belonging to a model ID described in the rule information; and (b) that indicates a function other than a function to be detected in any extraction rule included in the rule information, the rule information is updated by adding an extraction rule including condition information describing a condition that "the function indicated by the device generation information has not been used" to the rule information.

The following explains the case where when purchase result information with respect to a user having the user ID "UID1" indicates "No intention to purchase", the model information list 242 is as shown in FIG. 5 and the device operation information list 244 is as shown in FIG. 7.

In this case, device generation information that satisfies the above conditions (a) and (b) indicates the pasta boiling function. A user who has used the pasta boiling function is estimated not to purchase a product for users with wheat allergy. Accordingly as shown in FIG. 13, the rule information update unit 224 adds an extraction rule 1301 including condition information that describes a condition that "Past boiling has not been performed" to the rule information 901, and thereby updates the rule information 901. In this way, it is possible to increase a possibility that an extracted user is appropriate as an advertisement distribution destination by updating the rule information. Note that the rule information update processing does not necessarily need to be performed.

6. Modifications

Although the embodiment of the advertisement distribution system relating to the present invention has been explained, the exemplified advertisement distribution system may be modified as follows. The present invention is of course not limited to the advertisement distribution system exactly as explained in the above embodiment.

(1) In the above embodiment, the management server 10 detects an unused function included in each device, and selects an advertisement distribution destination by checking the detected unused function with rule information. However, the server 10 only needs to select a user appropriate as an advertisement distribution destination based on the detected unused function.

For example, the server 10 may not need to use rule information. Specifically, with respect to each of functions included in each device, the management server 10 beforehand makes an association between the function and an advertisement to be transmitted in the case where the function is judged to an unused function. In the case where an unused function is detected with respect to a device and an advertisement that is associated with a function judged to the unused function is an advertisement of an advertisement target product, a user who owns the device may be selected as an advertisement distribution destination.

(2) In the above embodiment, the explanation has been given with use of the pieces of rule information 901 and 902 as the rule information for extracting a user who is appropriate for an advertisement. However, these pieces of rule information are just examples. However, the rule information only needs to be configured such that the management server 10 extracts a user who is appropriate for an advertisement by comparing a detected unused function with the rule information. Also, in the above embodiment, examples of a user who is appropriate for an advertisement include a user with wheat allergy and a user with pollen allergy. However, a user who is appropriate for an advertisement is not limited to these users.

Also, in the above embodiment, the rule information is composed of two or three extraction rules. However, the rule information only needs to be configured such that a user who is appropriate for an advertisement is extracted. The rule information may be for example composed of one extraction rule, or four or more extraction rules.

Also, the rule information does not need to be composed of only a condition to be satisfied by an unused function. Alternatively, the rule information may be composed of a combination of a condition to be satisfied by an unused function and a condition to be satisfied by a used function. For example, the rule information 901 is composed of a combination of the extraction rules 911 and 912, which are conditions to be satisfied by an unused function, and the extraction rule 913, which is a condition (odor of okonomiyaki has not been sensed) to be satisfied by a used function (the odor sensing function).

Also, the rule information may includes, as an extraction rule, a condition to be satisfied by a material that is extracted based on detection results and measurement results that are respectively obtained through execution of a detection function and a measurement function included in the device, in addition to a condition to be satisfied by an unused function. The extraction rule here for example indicates that "Unused material is wheat flour".

Also, the management server 10 may collect, as device generation information of each device, measurement results obtained through execution of a measurement function such as temperature, humidity, and luminous intensity around the device, an amount of oil used for cooking, sensing results obtained through execution of a taste sensing function, and so on, in addition to the sensing results obtained through execution of the odor sensing function. Also, the management server 10 may collect, from a device relating to cooking, detection results of a used ingredient, weight measurement results of a dish and a food product, and so on.

(3) In the above embodiment, the management server 10 detects, as an unused function, a function which has not been used at all in each device. Alternatively, a function that has been used at an extremely lower frequency than other functions may be detected as an unused function. In this case, it is possible to detect, as an unused function, a function that can be estimated to have been used by a user only a small number of times out of necessity but not to be positively hoped by the user to be used.

(4) In the above embodiment, the management server 10 detects, as an unused function, a function which has not been used at all in a single year. Alternatively, a function that has not been used only for a certain period in the single year may be detected as an unused function. In this case, it is possible to extract, an advertisement distribution destination, a user who is appropriate for an advertisement for a particular period in the single year such as a particular season.

Further alternatively, a function that has not been used only for a particular period in a single day may be detected as an unused function. In this case, it is possible to extract, an advertisement distribution destination, a user who is appropriate for an advertisement for a particular period in the single day such as an evening period. For example, in the case where a user who has not used a cooking function in the in the evening, the user is estimated to frequently eat out. Accordingly, it is possible to generate advertisement information on a restaurant for eating out and transmit the advertisement information to the user.

(5) In the above embodiment, the management server 10 detects an unused function with use of all pieces of device operation information which are collected from each device. However, all the collected pieces of device operation information may not need to be used. Alternatively, the unused function may be detected with use of only pieces of device operation information that have been collected for the most recent predetermined period for example. In this case, it is possible to select an advertisement distribution destination in reflection of the most recent preference of a user.

Assume a case, for example, where an advertisement distribution destination is extracted with use of pieces of device operation information that have been collected for the most recent one month. In this case, it is possible to exclude, from an advertisement distribution destination, a user who had been a certain allergy one month before but has got over the allergy for the most recent one month.

(6) In the above embodiment, the management server 10 extracts a user with wheat allergy. However, a user to be extracted is not limited to this. Alternatively, a user with other allergy such as egg allergy and dairy allergy may be extracted. Further alternatively, a user may be extracted who cannot take a specific food for reasons of thought, religion, and so on, irrespective of whether the user is allergic to a specific material. Yet alternatively, a user may be extracted who avoids a specific material (for example, oil) for reasons of calorie concern, diseases, and so on, irrespective of whether the user is allergic to a specific material.

(7) In the above embodiment, the management server 10 detects an unused function with use of pieces of device operation information collected from each device. Alternatively, the management server 10 may detect a material that has not been used in execution of the function (hereinafter, referred to as unused material) with use of the collected pieces of device operation information, and determines the unused material as a specific material.

The following explains an example of procedure of detecting an unused material. The management server 10 stores therein beforehand a material information list shown in FIG. 20 in which a notification target function and materials that are to be used in execution of the notification target function in association with each other.

First, the control unit 205 included in the management server 10 extracts an unused function in the procedure explained in the above embodiment (procedure 1). Next, the control unit 205 refers to the material information list to extract one or more materials that are associated with the extracted unused function (procedure 2). Finally, the control unit 205 extracts, as a specific material, a material that is not associated with another function that has been executed by a device among the extracted materials (procedure 3).

Here, the procedures 1 to 3 are supplemented with use of a specific example. Assume a case, for example, where the wheat flour bread making function is extracted as an unused function in the procedure 1. Also, collected pieces of device operation information are assumed to include respective pieces of device generation information indicating the rice flour bread making function and the mochi making function as executed functions. In this case, materials including wheat flour, salt, sugar, butter, . . . are extracted in the procedure 2, as materials that are associated with the unused function extracted in the procedure 1. Here, materials including salt, sugar, butter, . . . are associated with the rice flour bread making function and/or the mochi making function among the materials including wheat flour, salt, sugar, butter, . . . which are extracted in the procedure 2. This results in that the control unit 205 extracts wheat flour as the unused material in the procedure 3.

(8) In the above Modification (7), a material that has not been used at all is detected as an unused material. Alternatively, a material whose amount that has been used is a predetermined amount or less, or a material that has been used at a predetermined frequency or less may be detected as an unused material.

The following explains an example where a material, specifically salt, whose amount that has been used is a predetermined amount or less is detected as an unused material. As shown in FIG. 21A, the storage unit 203 included in the management server 10 stores therein a point table that describes a model ID, device generation information, and a use point in association with each other. The use point indicates a value that has been determined beforehand in accordance with an amount of salt to be used in a function indicated by device generation information. For example, a rice flour bread (normal) making function is associated with a use point of 3 indicating that a normal amount of salt is to be used. A rice flour bread (reduced salt) making function is associated with a use point of 2 indicating that a small amount of salt is to be used. A mochi making function is associated with a use point of 1 indicating that an extremely small amount of salt is to be used. The storage unit 203 also stores therein rule information shown in FIG. 21B. The rule information describes a condition for extracting salt as an unused material in the case where a used amount of salt is a predetermined amount or less. Specifically, the rule information describes a condition that the total of use points per month is 10 or less.

First, with respect to pieces of device operation information that have been collected from a device for the most recent one month, the control unit 205 included in the management server 10 judges whether respective pieces of device generation information included in the collected pieces of device operation information are each described in the point table. When judging the piece of device generation information is described in the point table, the control unit 205 adds the use point that is associated with the piece of device generation information in the point table. In the case where the condition described in the rule information shown in FIG. 21B is satisfied, that is, in the case where the total of the use points is 10 or less, the control unit 205 extracts salt as an unused material.

Then, in the case where the unused material (salt in the present modification) is determined as a specific material, the management server 10 transmits an advertisement of an advertisement target product that is targeted for users who do not prefer this specific material to a user who owns the device with respect to which salt is detected as the unused material.

(9) In the above embodiment and modifications, the explanation has been given on the examples where a user with food allergy and a user with pollen allergy are extracted. However, it is only necessary to extract a user with allergy to a specific material. For example, the specific material may be a specific material used for clothes (such as chemical fiber). In this case, the management server 10 judges whether pieces of device operation information that have been collected from a washing machine that is one of devices owned by a user indicate a function to be used for clothes made of a specific material (such as a washing function and a drying function in accordance with a washing procedure dedicated for the specific material). When judging that the collected pieces of device operation information do not indicate the function to be used for clothes made of the specific material, the management server 10 judges that the user who owns the washing machine is allergic to the specific material.

(10) In the above embodiment, an advertisement of a product is distributed to an advertisement distribution destination. Alternatively, an advertisement of service may be distributed. For example, in the case where a user who has not used a function of making dishes using oil is extracted as an advertisement distribution destination, an advertisement of a food item made using little oil as an advertisement target product may be distributed to the user. Alternatively, an advertisement of a restaurant or an accommodation that serves dishes made using little oil as an advertisement target service may be distributed to the user.

(11) In the above embodiment, the management server 10 stores therein pieces of device operation information separately for each device. However, it is only necessary to store the pieces of device operation information such that an unused function is detected. For example, respective pieces of device operation information received from a plurality of device that belong to the same model may be stored as pieces of device operation information of one device without distinction between the devices.

(12) In the above embodiment, an advertisement distribution destination is selected in units of users. Alternatively, an advertisement distribution destination may be selected in units of groups such as families and corporations. In this case, a list of information on a representative of a group such as a family and a corporation may be used, instead of the above private information list.

(13) In the above embodiment, a user, who shows intention to purchase a product, purchases the product on a purchase website indicated by a URL set in an advertisement image displayed on a purchase terminal owned by the user. However, the user only needs to be able to purchase the product. For example, the management server 10 may function as the purchase website.

(14) In the above embodiment, rule information is updated as follows. In the case where there is device generation information: (a) that is collected from a device belonging to a model ID described in the rule information; and (b) that indicates a function other than a function to be detected in any extraction rule included in the rule information, the rule information is updated by adding an extraction rule including condition information describing a condition that "the function indicated by the device generation information has not been used" to the rule information. However, this update procedure is just as an example. Alternatively, the rule information may be updated by another update procedure according to which the rule information is updated with use of device generation information and an unused function, and the updated extraction rule is used to increase a possibility that the extracted user is appropriate as an advertisement distribution destination.

(15) In the above embodiment, each device is disposed inside a home of a user who owns the device. However, disposition location of the device does not need to be limited, and the device only needs to be capable of communicating with the management server 10. Also, communication between the device and the management server 10 does not necessarily need to be performed via the router 50, and alternatively may be performed directly.

(16) In the above embodiment, the explanation has been given on the example where the first device 30-1 to the third device 30-3 are respectively an automatic bread baker, a microwave oven, and an air conditioner equipped with an odor sensor, and the fourth device 30-4 and the fifth device 30-5 are each a ventilating fan. However, these devices each only need to be a home appliance that is capable of communicating with the management server 10 and transmitting device generation information to the management server 10. The first device 30-1 to the fifth device 30-5 each may be for example, instead of the above home appliances, a smart-phone, a ceiling light, a television, a BD player, a facsimile machine, an air conditioner, an oven stove, a body composition analyzer, a rice cooker, a washing machine, a recording/playback device for video and audio, a vacuum cleaner, an air cleaner, a printer, an electric pot, a coffee maker, a phone, a mobile phone, and an alarm clock. Note that the function execution units 304 for achieving the functions of the respective devices differ in configuration between these devices.

(17) In the above embodiment, the management server 10 is embodied as one computer. However, the management server 10 only needs to be configured to achieve the functions explained on the management server 10 in the above embodiment. For example, the management server 10 may be embodied as a cloud that is composed of a plurality of computers, storage devices, and so on.

(18) It is possible to record the following control program in a recording medium or distribute the control program via various types of communication paths. The control program is composed of program codes in a machine language or a high-level language for causing the respective processors included in the management server 10 and the first device 30-1 to the fifth device 30-5, and various types of circuits that are connected to the processors to perform the processing, which is explained in the above embodiment, including the device operation information collection processing, the advice information display processing, the advertisement distribution target information acquisition processing, the rule information acquisition processing, the advertisement distribution destination information generation processing, the advertisement distribution processing, and the rule information update processing. Examples of such a recording medium include an IC card, a hard disk, an optical disc, a flexible disc, a ROM, and a flash memory. The distributed control program is stored in a memory or the like that is readable by a processor for use, and the functions explained in the above embodiment are achieved by the processor executing the control program. Instead of executing the control program, the processor may execute the control program after compile or use an interpreter.

(19) The following functional elements explained in the above embodiment may be embodied as a circuit for achieving the function thereof, or may be embodied through execution of a program by one or more processors, such as the input unit 201, the communication unit 202, the storage unit 203, the clock unit 204, the control unit 205, the advice information generation unit 221, the advertisement distribution destination information generation unit 222, the advertisement distribution processing unit 223, the rule information update unit 224, the information processing unit 225, the input unit 301, the communication unit 302, the storage unit 303, the function execution unit 304, the control unit 305, and the display unit 306.

Note that the above functional elements may be representatively embodied as an LSI that is an integrated circuit. These functional elements may be separately integrated into a single chip, or integrated into a single chip including part or all of the functional elements. Furthermore, the LSI may be called an IC, a system LSI, a super LSI, and an ultra LSI, depending on the integration degree. A method of circuit integration is not limited to LSIs, and may be realized by a dedicated circuit or a general processor. Furthermore, it may be possible to use an FPGA (Field Programmable Gate Array) programmable after manufacturing LSIs or a reconfigurable processor in which connection and setting of a circuit cell inside an LSI is reconfigurable after manufacturing LSIs. Furthermore, when a new technology for forming integrated circuits that replaces LSIs becomes available as a result of progress in semiconductor technology or semiconductor-derived technologies, functional blocks may of course be integrated using such technology. One possibility lies in adaptation of biotechnology.

(20) The present invention may be any partial combination of the above embodiment and modifications.

7. Supplement

The following further describes configuration of an advertisement distribution method and an advertisement distribution system as one embodiment of the present invention, and modifications and effects thereof.

(1) One aspect of the present invention provides an advertisement distribution method that is executed by an advertisement distribution system that distributes an advertisement of a product to a user among a plurality of users who is expected to purchase the product, the advertisement distribution method comprising: a collecting step of collecting, from each of one or more of home appliances that are owned by each of the users, one or more pieces of execution information each indicating a function that has been executed by the home appliance; a detecting step of, with respect to each of the users, detecting an unused function that has not been used in each of the home appliances owned by the user by analyzing the pieces of execution information collected from the home appliance and functions included in the home appliance; and a transmitting step of extracting the user who is expected to purchase the product based on a result of the detection performed by the detection step, and transmitting the advertisement to one or more of the home appliances owned by the extracted user.

According to this configuration, it is possible to determine an advertisement distribution destination of a product that has a low direct relevance to pieces of execution information collected from each home appliance. Note the execution information is equivalent to the device generation information in the above embodiment.

(2) Also, the product may be targeted for users who do not prefer a specific material, and in the transmitting step, with respect to each of the home appliances owned by each of the users, the user who owns the device with respect to which the unused function using the specific material is not detected may be extracted as the user who is expected to purchase the product.

According to this configuration, it is possible to extract, as the advertisement distribution destination of the product that has a low direct relevance to the pieces of execution information collected from each of the home appliances, a user who does not prefer a specific material.

(3) Also, the advertisement distribution method may further comprise a displaying step of displaying that the home appliance with respect to which the unused function is detected includes the unused function, on one or more of the home appliances owned by the user who owns the home appliance with respect to which the unused function is detected.

According to this configuration, with respect to a function included in a home appliance detected as an unused function, it is possible to increase a possibility that the function has not been used not because a user has not recognized that the function is included in the home appliance but because the user has hoped not to use the function despite of that the user has recognized that the function is included in the home appliance.

(4) Also, the product may be useful for a particular period in a single year, and in the detecting step, a function that has not been used for the particular period is detected as the unused function.

According to this configuration, it is possible to extract a user who is appropriate for an advertisement of a product that is useful for a specific period in a single year such as seasonal goods.

(5) Also, in the detecting step, a function indicated by a predetermined number or less of pieces of execution information may be detected as the unused function.

According to this configuration, it is possible to detect, as an unused function, even a function that has been used by a user at a low frequency out of necessity but is not positively hoped by the user to be used. This allows to add such a user to an extraction target, thereby more appropriately extracting a user who do not prefer a specific material.

(6) Also, in the detecting step, the pieces of execution information that have been collected for a last predetermined period may be used.

According to this configuration, it is possible to more appropriately extract a user who is estimated to purchase a product among a plurality of users, based on the user's last operations made on a home appliance owned by the user.

(7) Also, the product may be targeted for users who do not prefer a specific material, and in the transmitting step, the user who has used the specific material at a low frequency may be extracted based on the unused function as the user who is expected to purchase the product.

According to this configuration, it is possible to add, as an extraction target, even a user who has used a specific material at a low frequency out of necessity but does not positively hope to use the specific material. This allows to more appropriately extract such a user who does not prefer the specific material.

(8) One aspect of the present invention provides an advertisement distribution system that distributes an advertisement of a product to a user among a plurality of users who is expected to purchase the product, and includes a server and one or more home appliances that are owned by each of the users, wherein the server comprises: a collection unit configured to collect, from each of one or more of home appliances that are owned by each of the users, one or more pieces of execution information each indicating a function that has been executed by the home appliance; a detection unit configured to, with respect to each of the users, detect an unused function that has not been used in each of the home appliances owned by the user by analyzing the pieces of execution information collected from the home appliance and functions included in the home appliance; and a transmission unit configured to extract the user who is expected to purchase the product based on a result of the detection performed by the detection step, and transmit the advertisement to one or more of the home appliances owned by the extracted user.

According to this configuration, it is possible to determine an advertisement distribution destination of a product that has a low direct relevance to pieces of execution information collected from each home appliance.

INDUSTRIAL APPLICABILITY

The advertisement distribution method relating to the embodiment of the present invention allows to extract an advertisement distribution destination of a product that has a low direct relevance to pieces of execution information collected from each home appliance. Therefore, the advertisement distribution method is suitable for a system for selecting a more number of appropriate advertisement distribution destinations and distributing an advertisement to the selected advertisement distribution destinations.

REFERENCE SIGNS LIST 1 advertisement distribution system
10 management server
30-1 to 30-5 first device to fifth device
40 purchase terminal
50 router
201 input unit
202 communication unit
203 storage unit
204 clock unit
205 control unit
221 advice information generation unit
222 advertisement distribution destination information generation unit
223 advertisement distribution processing unit
224 rule information update unit
225 information processing unit
301 input unit
302 communication unit
303 storage unit
304 function execution unit
305 control unit
306 display unit
601 device list
602 purchase terminal list
701, 702 device generation information
901, 902 rule information
911 to 913, 921, 922, 1301 extraction rule
1101 advice image
1201 advertisement image

The invention claimed is:

1. An advertisement distribution method for distributing an advertisement to a user that is executed in an advertisement distribution system by a computer connected to one or more home appliances that are owned by the user, the advertisement distribution method comprising:
a storing step of storing, by a processor included in the computer, a list indicating association between functions being executable by a first home appliance from among the home appliances and foods to be used in the functions, the functions including a first function and a second function, the foods including a first food and a second food, the first function being associated with the first food and the second food, and the second function being associated with the first food;
an acquiring step of acquiring, by the processor, execution information indicating that the second function has been executed by the first home appliance, the execution information being generated and transmitted by the first home appliance after the first home appliance executes the second function, and the received execution information being included in an execution history indicating one or more functions that have been executed by the first home appliance;
a detecting step of (i) detecting, by the processor using the execution history, that the first function has not been executed by the first home appliance and that the second function has been executed by the first home appliance, and (ii) detecting, as a specific food, the second food from among a set of foods which are (a) associated with the unexecuted first function and (b) not associated with the executed second function; and
a transmitting step of transmitting, by the processor, the advertisement to the first home appliance, wherein
the advertisement is an advertisement of an alternative food that is an alternative to the specific food and is targeted to users who cannot eat the specific food.

2. An advertisement distribution method for distributing an advertisement to a first user among a plurality of users, the advertisement distribution method being executed in an advertisement distribution system by a computer connected to one or more of home appliances that are owned by each of the users, the advertisement distribution method comprising:
a storing step of storing, by a processor included in the computer, a list indicating association between functions being executable by a first home appliance owned by the first user and foods to be used in the functions, the functions including a first function and a second function, the foods including a first food and a second food, the first function being associated with the first food and the second food, and the second function being associated with the first food;
an acquiring step of acquiring, by the processor, execution information indicating that the second function has been executed by the first home appliance, the execution information being generated and transmitted by the first home appliance after the first home appliance executes the second function, and the received execution information being included in an execution history indicating one or more functions that have been executed by the first home appliance;
a detecting step of (i) detecting, by the processor using the execution history, that the first function has not been executed by the first home appliance and that the second function has been executed by the first home appliance, and (ii) detecting, as a specific food, the second food from among a set of foods which are (a) associated with the unexecuted first function and (b) not associated with the executed second function; and
a transmitting step of transmitting, by the processor, the advertisement to the first home appliance, wherein
the advertisement is an advertisement of an alternative food that is an alternative to the specific food and is targeted to users who cannot eat the specific food.

3. The advertisement distribution method of claim 2, further comprising
   a displaying step of displaying, by the processor on one or more of the home appliances owned by the first user, that the first home appliance owned by the first user has the first function.

4. The advertisement distribution method of claim 2, wherein
   the alternative food is suitable for advertisement for a particular period in a single year, and
   in the detecting step, the specific food is detected for the particular period.

5. The advertisement distribution method of claim 2, wherein
   in the detecting step, a function whose execution frequency in the execution history is a predetermined frequency or lower is detected as not having been executed.

6. The advertisement distribution method of claim 2, wherein
   in the detecting step, the execution history that has been acquired for a last predetermined period is used.

7. An advertisement distribution system that distributes an advertisement to a user, the advertisement distribution system comprising a server and one or more home appliances that are owned by the user, the server being connected to the one or more home appliances that are owned by the user,
   wherein the server comprises a processor configured to:
      store a list indicating association between functions being executable by a first home appliance from among the home appliances and foods to be used in the functions, the functions including a first function and a second function, the foods including a first food and a second food, the first function being associated with the first food and the second food, and the second function being associated with the first food;
   acquire execution information indicating that the second function has been executed by the first home appliance, the execution information being generated and transmitted by the first home appliance after the first home appliance executes the second function, and the received execution information being included in an execution history indicating one or more functions that have been executed by the first home appliance;
   detect that the first function has not been executed and the second function has been executed by the first home appliance based on the execution history;
   using the execution history, detect, as a specific food, the second food from among a set of foods which are (a) associated with the unexecuted first function and (b) not associated with the executed second function; and
   transmit the advertisement to the first home appliance, and
wherein the advertisement is an advertisement of an alternative food that is an alternative to the specific food and is targeted to users who cannot eat the specific food.

\* \* \* \* \*